US012207601B2

(12) United States Patent
Aguilar Sandra et al.

(10) Patent No.: US 12,207,601 B2
(45) Date of Patent: Jan. 28, 2025

(54) FOGPONICS APPARATUS, SYSTEM AND METHOD

(71) Applicant: PLANTAFORM TECHNOLOGY INC., Gatineau (CA)

(72) Inventors: Albert Aguilar Sandra, Gatineau (CA); Kiwa Lang, Sydney (AU); Luke Kelly, Gatineau (CA); Andres Torres, Gatineau (CA)

(73) Assignee: PLANTAFORM TECHNOLOGY INC.

( * ) Notice: Subject to any disclaimer, the term of this patent is extended or adjusted under 35 U.S.C. 154(b) by 75 days.

(21) Appl. No.: 17/916,890

(22) PCT Filed: May 21, 2021

(86) PCT No.: PCT/CA2021/050694
§ 371 (c)(1),
(2) Date: Oct. 4, 2022

(87) PCT Pub. No.: WO2021/232166
PCT Pub. Date: Nov. 25, 2021

(65) Prior Publication Data
US 2023/0180686 A1  Jun. 15, 2023

Related U.S. Application Data

(60) Provisional application No. 63/116,692, filed on Nov. 20, 2020, provisional application No. 63/028,269, filed on May 21, 2020.

(51) Int. Cl.
*A01G 31/02* (2006.01)
*A01G 7/04* (2006.01)

(52) U.S. Cl.
CPC ............. *A01G 31/02* (2013.01); *A01G 7/045* (2013.01)

(58) Field of Classification Search
CPC .. A01G 31/02; A01G 7/045; A01G 2031/006; A01G 31/06; A01G 27/001;
(Continued)

(56) References Cited

U.S. PATENT DOCUMENTS 11,849,681 B1 * 12/2023 Allgeier ................. A01G 9/023
2015/0313104 A1   11/2015 Cottell
(Continued)

FOREIGN PATENT DOCUMENTS

CN        10576606       7/2016
WO     2015123725 A1    8/2015
(Continued)

OTHER PUBLICATIONS

Eve, L. 2015. PlantLab could grow fruit and vegetables for the entire world in a space smaller than Holland Link: https://inhabitat.com/dutch-company-plantlabs-agricultural-revolution-could-grow-the-worlds-fruit-and-veg-in-a-space-smaller-than-holland/plantlab-lead/.

(Continued)

*Primary Examiner* — Trinh T Nguyen
(74) *Attorney, Agent, or Firm* — Christian Cawthorn; NORTON ROSE FULBRIGHT CANADA LLP

(57) ABSTRACT

A fogponics apparatus is provided. The apparatus comprises a fog channel and an air channel. The fog channel has a first fog channel end that is open, and a second fog channel end that is closed. The air channel is within the fog channel and has a first air channel end extending past the first fog channel end, and a second air channel end within the fog channel. The second air channel end is distanced away from the closed second fog channel end such that when vaporized liquid is sent from the first air channel end to the second air (Continued)

channel end, the vaporized liquid egresses the second air channel end and travels through the fog channel to the first fog channel end.

24 Claims, 38 Drawing Sheets

(58) Field of Classification Search
CPC .... A01G 27/003; A01G 27/006; A01G 27/02; A01G 27/06; A01G 9/20; A01G 9/24; A01G 9/247; A01G 9/249; A01G 9/26
See application file for complete search history.

(56) References Cited

U.S. PATENT DOCUMENTS

| | | | | |
|---|---|---|---|---|
| 2020/0404862 | A1* | 12/2020 | Bowles | F25B 21/04 |
| 2021/0105955 | A1* | 4/2021 | Schroeder | A01G 9/246 |
| 2021/0212276 | A1* | 7/2021 | Hersh | A01G 31/06 |
| 2022/0061242 | A1* | 3/2022 | Sperry | A01G 31/06 |
| 2022/0174899 | A1* | 6/2022 | Liang | A01G 27/008 |
| 2023/0172119 | A1* | 6/2023 | Lee | A01G 27/008 47/66.1 |
| 2023/0354758 | A1* | 11/2023 | Wantland | A01G 9/247 |

FOREIGN PATENT DOCUMENTS

| | | |
|---|---|---|
| WO | 2019146929 A1 | 8/2019 |
| WO | 2020041242 A1 | 2/2020 |

OTHER PUBLICATIONS

Levenston, M. 2011. Philips Lighting promotes city farming. City Farmer News Link: https://cityfarmer.info/philips-lighting-promotes-city-farming/.
AeroFarms. 2019. AeroFarms—Our Technology Link: https://www.aerofarms.com/how-we-grow/.
Blank, T. 2014. Future Growing LLC Link: https://futuregrowing.wordpress.com/tag/tim-blank/.
Mr. Stacky Smart Farm Hydroponic Tower Garden System Link: https://mrstacky.com/smart-farm.html.
Smartgarden. 2017/2019 Link: https://ca.clickandgrow.com/products/the-smart-garden-3.
Cooper, D. 2013 GrowCube promises to grow food with ease indoors (hands-on). Engadget Link: https://www.engadget.com/2013-11-08-insert-coin-growcubes-hands-on.html Link: https://www.engadget.com/2013-11-08-insert-coin-growcubes-hands-on.html?ncid=rss_truncated&a_dgi=aolshare_pinterest.
Cropbox 2017. A new, smarter way to farm Link: https://cropbox.co/.
Foody12 Foody 12 Hydroponic Tower—44 Plant Ebb and Flow System https://foodyverticalgarden.com/products/foody-12-hydroponic-system.
(WHO), W. H. O. Feb. 2019 Obesity and overweight Link: https://www.who.int/news-room/fact-sheets/detail/obesity-and-overweight.
Benis, K. Jun. 2018. Commercial farming within the urban built environment—Taking stock of an evolving field in northern countries. vol. 17, pp. 30-37.
Boyd, B. Urbanization and the Mass Movement of People to Cities. Grayline. Link: https://graylinegroup.com/urbanization-catalyst-overview/.
Chan, R. W. Jan. 17, 2018. Building resilient food systems for ASEAN's megacities CSRASIA Link: https://www.elevatelimited.com/insights/newsletters/building-resilient-food-systems-for-aseans-megacities/.
Dietrich Knorr, C. S. H. K., Mary Ann Augustin Jan. 19, 2018. Food for an Urban Planet: Challenges and Research Opportunities Link: https://www.frontiersin.org/articles/10.3389/fnut.2017.00073/full.
Fresco, L. Feb. 2009. Feeding the whole world. In: Fresco, L. (ed.) Ted Talks. Link: https://www.researchgate.net/scientific-contributions/LO-Fresco-65042501.
John Joh, U. S. B. B., Sascha Kohlmann 2017. Is There Enough Food for the Future? Food Matters http://www.environmentreports.com/enough-food-for-the-future/.
Khadija Benis, A. A. R. G., C. F. Reinhart Oct. 2018. Urban Foodprints (UF)—Establishing baseline scenarios for the sustainability assessment of high-yield urban agriculture. International Journal of Design & Nature and Ecodynamics Link: https://www.researchgate.net/publication/328225946_Urban_Foodprints_UF_-_Establishing_baseline_scenarios_for_the_sustainability_assessment_of_high-yield_urban_agriculture.
Kheir, A.-K. 2018. The Vertical Farm: A Review of Developments and Implications for the Vertical City. Basel, 8 Link: https://www.mdpi.com/2075-5309/8/2/24.
Nations, U. 2017. World Population Prospects. In: Affairs, D. O. E. A. S. (ed.) Link: https://population.un.org/wpp/publications/Files/WPP2017_Methodology.pdf.
Sinatra, S. T. Food Allergies So Common Now—Why? Link: https://heartmdinstitute.com/health-and-wellness/food-allergies-so-common-why/.
Suzuki, D. Jun. 26, 2015. Science matters: Pope Francis offers hopeful perspective on global crises Link: https://davidsuzuki.org/story/pope-francis-offers-hopeful-perspective-on-global-crises/.
PCT/CA2021/050694—International Search Report / Written Opinion.
Elliot, S. Dec. 27, 2016. Figuring Out Fogponics. Link: https://www.maximumyield.com/figuring-out-fogponics/2/1361.
Maximumyield. 2016. Fogponics [Online]. [Accessed Apr. 6, 2019] Link: https://www.maximumyield.com/figuring-out-fogponics/2/1361.
Kim, J. 2018. Orchard.
Lin, C. 2012. Pod.
Mesaric, D. 2017. InGarden.
Ponicsfarm. 2019. Fog Monster [Online]. [Accessed Apr. 7, 2019].
Ortiz-Ospina, M. R. A. E. 2013. World Population Growth Link: https://ourworldindata.org/world-population-growth.
Revello, R. Sep. 8, 2017 Urban Feature: Urban Food Security [Accessed Mar. 13, 2019].

* cited by examiner

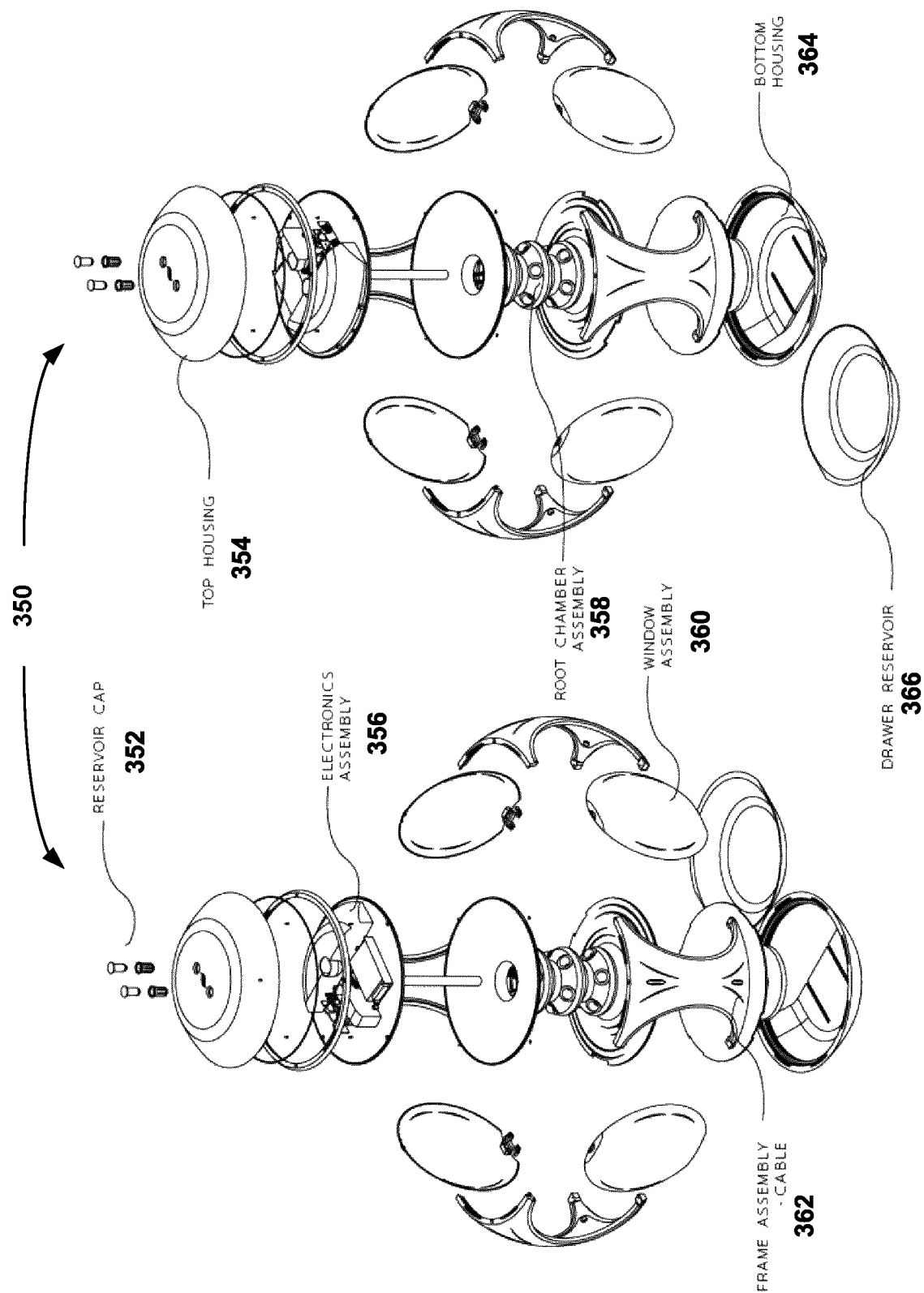

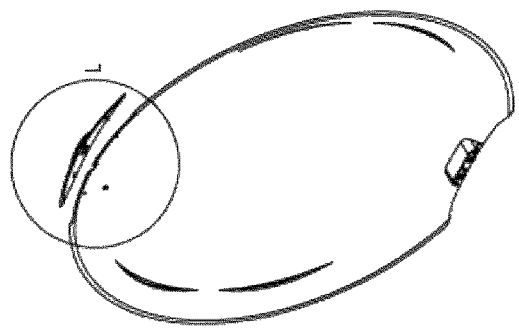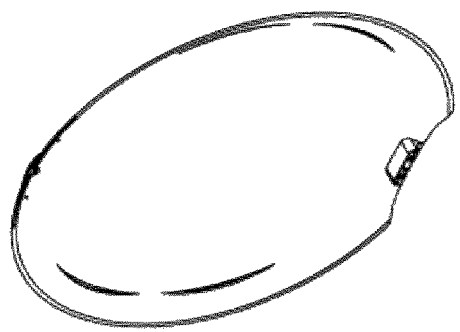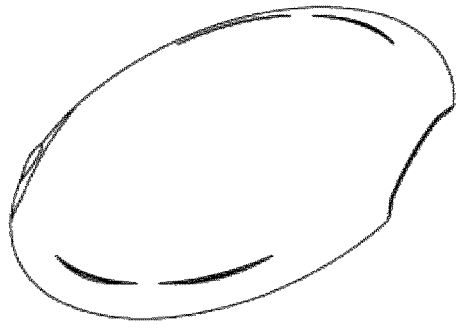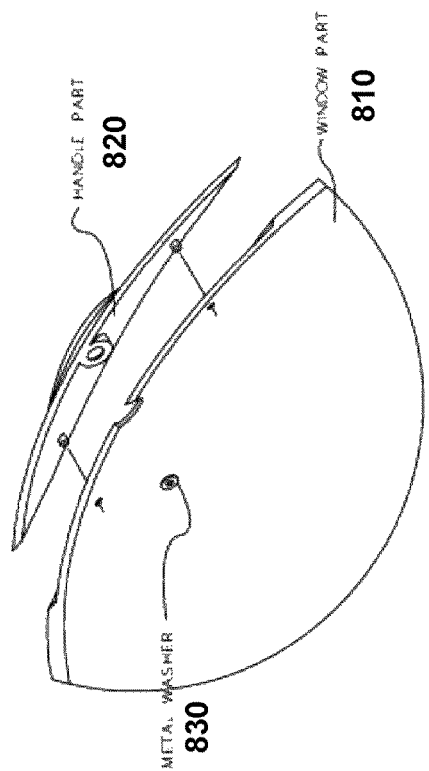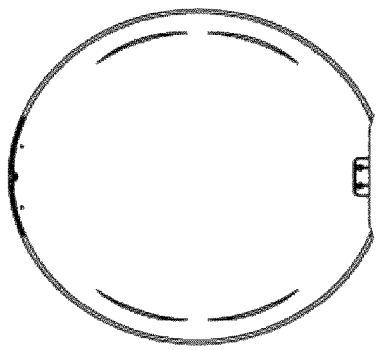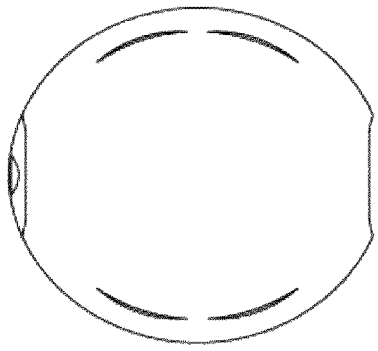
FIG. 8C

How it works

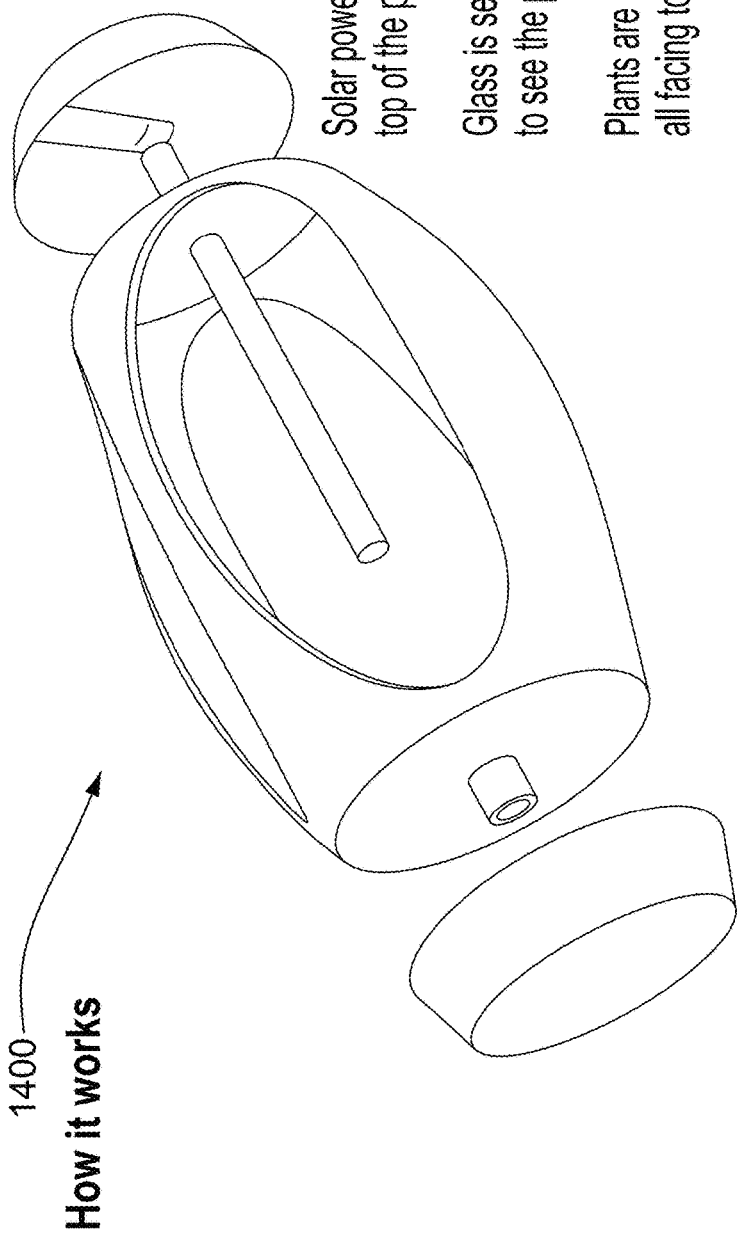

1400

Solar powered LED fits through the top of the product.

Glass is see through so you are able to see the plants growing.

Plants are placed into the four sides, all facing towards the LED light.

Two parts are snap fitted together.

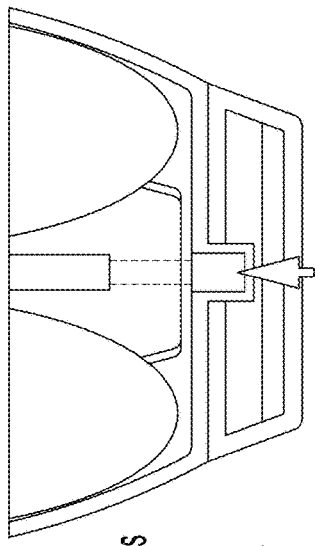

FIG. 14

Water is placed in the bottom of the product. It is turned into fog through the bottom sonic fogger and spreads through all the plants roots (which are hanging into the four vertical sides).

Once water is out or running low, it can be taken off and re-filled.

1600

1600

FOGPONICS APPARATUS, SYSTEM AND METHOD

CROSS REFERENCE TO RELATED APPLICATIONS

This application is a non-provisional of, and claims all benefit, including priority, to U.S. Application No. 63/028,269, dated May 21, 2020 entitled FOGPONICS APPARATUS, SYSTEM AND METHOD, and to U.S. Application No. 63/116,692, dated Nov. 20, 2020 entitled FOGPONICS APPARATUS, SYSTEM AND METHOD, each of which are incorporated herein in their entirety by reference.

FIELD

The present disclosure relates generally to horticulture, and in particular to a fogponics apparatus, system and method.

INTRODUCTION

As towns become cities, and cities become megacities many issues are arising, such as food security. While cities are continuously growing in population and size, farmlands and agriculture that grow fresh produce and crops will start to become replaced. Increased human population combined with climate change puts necessity to increase food supply, thus establishing the need for new innovative farming methods and new ways of approaching land use.

In recent years, trends show that urban agriculture is a solution to the increase in food demand. It reduces the requirement for vast amounts of land and extensive transportation of food. Recent advances in horticultural technologies have provided a promising future for urban farming. These include hydroponics, aeroponics, aquaponics and fogponics.

There are several horticultural products in aeroponics and fogponics industry. The main horticultural methods follow the theme of Controlled-Environment Agriculture, where all plant growth is monitored and grown in an enclosed space. Many of the current products are high end, complex or expensive products. Suggestively, this is due to designs having the latest technology, using high amounts of energy to operate and the scale being quite large to produce greater yields.

Drawbacks in current horticultural products in the aeroponics and fogponics space include i) they produces very little yield if it is not a commercial/industrial design; ii) They lack the integration of technology with horticulture to maximize yield; and iii) they rely on human maintenance to monitor growth.

SUMMARY

In some embodiments, there is provided a fogging subsystem. The fogging subsystem comprises a fog channel and an air channel. The fog channel has a first fog channel end that is open and a second fog channel end that is closed. The air channel is located within the fog channel and has a first air channel end extending past the first fog channel end, and a second air channel end within the fog channel. The second air channel end is distanced away from the closed second fog channel end such that when vaporized liquid is sent from the first air channel end to the second air channel end, the vaporized liquid egresses the second air channel end and travels through the fog channel to the first fog channel end.

In some embodiments, there is provided a fogging method. The method comprises sending vaporized liquid from a first end of an air channel to a second end of the air channel. The air channel is within a fog channel that has a first fog channel end that is open and a second fog channel end that is closed. The first air channel end extends past the first fog channel end. The second air channel end is within the fog channel. The second air channel end is distanced away from the closed second fog channel end such when the vaporized liquid egresses from the second air channel end. The vaporized liquid travels through the fog channel to the first fog channel end.

In some embodiments, there is provided a fogponics apparatus. The apparatus comprises a fog functionality subsystem for actuating expansion and contraction of the apparatus, and a lighting system for providing LED light to a plant growing area of the apparatus.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures:

FIGS. 3B to 3G illustrate, in an exploded component views, another example of a fogponics system assembly, in accordance with some embodiments;

FIG. 8C illustrates several views of an example of a window assembly, in accordance with some embodiments;

FIG. 14 illustrates an example of a functionality of aeroponics towers, in accordance with some embodiments;

It is understood that throughout the description and figures, like features are identified by like reference numerals.

DETAILED DESCRIPTION

Figure 1:
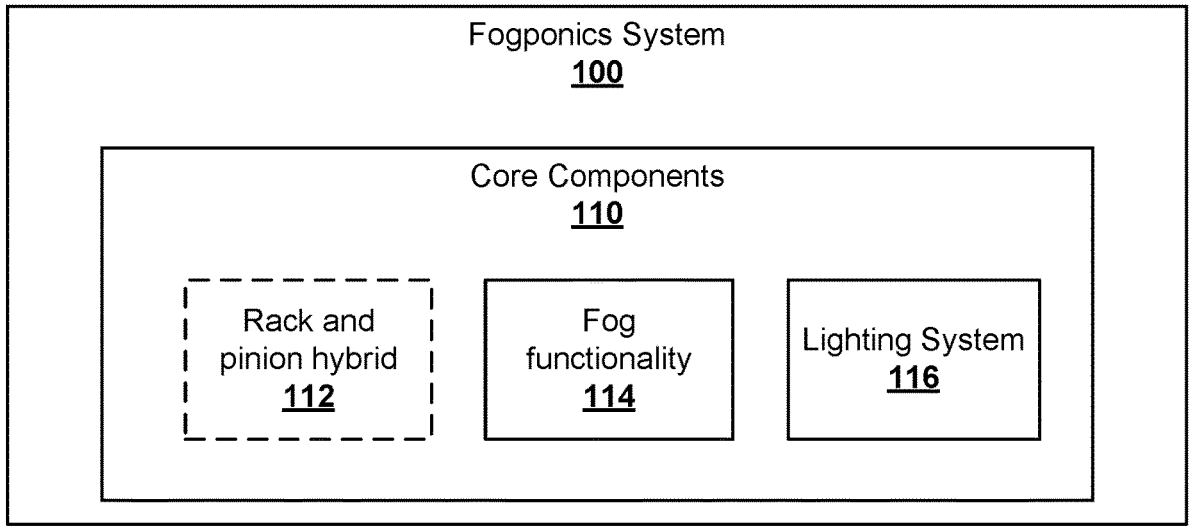
FIG. 1 illustrates, in a schematic diagram, an example of a fogponics system, in accordance with some embodiments.

Embodiments of methods, systems, and apparatus are described through reference to the drawings.

A fogponics device is provided that works by adequately providing all the needs that plant cultivars need to grow. Plants need visible-light exposure on their leaves to allow for photosynthesis, they need a support-structure for the base of the plant. Herb, lettuce, flowering, and fruiting cultivars' roots need to absorb water and nutrients, as well as oxygen to successfully grow from seed to harvest.

The device provides a controlled environment setting that is tailored to the specific needs of each plant cultivar and successfully grow a wide variety of cultivars in the device. The device can provide this environment with the use of some key components and scientifically driven information.

Aspects that enable this device to grow a wide variety of plant cultivars include the lighting apparatus, light controller, the root chamber, the fogger chamber, the ultrasonic foggers, the nutrient solenoid valve, the water solenoid valve, the water storage tank, the nutrient storage tank, the water-level sensor, the fan, the fan/nutrient/water tube, and the electronic control system that utilizes the electronic components to create the environmental conditions in the device that each plant cultivar needs to successfully grow.

The device's features that limit the type of cultivar grown in the device are largely determined by the cultivar size and the cultivars' optimal temperature range. The plant size can often be bypassed as a limiting factor in determining which cultivars can grow in the device by continual harvesting of certain cultivars like many herb species, whose size can be maintained by removing the parts of the plant shoot system that will outgrow the device, over compete for space with adjacent plants, or grow too close to the lights.

Fogponics

Fogponics is an advanced form of aeroponics, using water in vaporized form to transfer oxygen and nutrients directly to the roots of the plant instead of water droplets being sprayed through a nozzle onto plant roots (aeroponics). Aeroponic systems supply nutrients to plant roots. Fogponics systems deliver vapor to stems and leaf nodes as well as roots, resulting in efficient nutrient uptake and health plants overall.

A fogponics system produces a very light mist that floats in the air like fog. Using the same principle as aeroponics, fogponics uses approximately 5-30 µm (micrometre) mist within the rooting chamber as the fundamental feeding method. As plants absorb nutrients best from a 5-25 µm range, the smaller the nutrient particles the easier and faster absorption for the plants. Benefits over hydroponic systems are that the plant requires less energy in root growth and mass, but still able to produce the same yield or even greater.

Fogponics is a sustainable method in current horticulture due to the fact that no water or nutrient is lost to evaporation. However, it requires regular use of electric power to produce mist and fog for the plants. The technology also requires a backup generator, as it could have detrimental effects on the plants during a power outage.

The present disclosure describes a horticultural solution that includes automation, lighting and fogponics. The fogponics apparatus, system and method described herein can be used as a regenerative food source for domestic use, which requires little maintenance, produces high yield and can be seen as a living sculpture in a futuristic interior setting.

Lighting Technologies

One component to successful vertical farming is the LED lighting system. When LED lighting to indoor farming was first introduced, it provided 28% efficiency to faster plant growth and less energy costs. Today, there exists LEDs with 68% efficiency that can help make urban farming cost-effective and help to grow crops on a smaller footprint. LED lighting optimizes the wavelength of light needed to grow the crops by emitting one colour of light, and calibrates the natural environment the plants grow in. Sunlight emits various numbers of light spectra the plant does not use. By replacing sunlight with optimized lighting colours that the plant needs for photosynthesis (blue, red and infrared), no light is wasted.

LED lighting is used because it is the most energy efficient lighting across all urban farming systems as it generates less heat than conventional lighting. It also is one of the most energy efficient sources of lighting. Purple (or violet) mimics the natural sunlight for photosynthesis. The uv rays emit a wavelength that is shows as red and blue on the light spectra, which is why you see all urban farming use purple LEDs.

Each plant bed have two LED that are concentrating light onto it. The plant beds are directly under the light. (8 bed 16 LEDs). Clear acrylic sheets are laser cut and placed in front of the lights after the lights are installed. The acrylic helps with keeping excess heat away from the plants and it helps spread the light spectra and not purely concentrated. Also, it helps keep any water reaching the electrical components.

Different crops benefit from different light wavelengths during different stages of plant growth. In some embodiments, such information can be stored in the memory 804, 904 and accessed such that the processor 802, 902 can actuate appropriate lighting conditions for a particular plants at their current growth stage.

In some embodiments, the lighting comprises four custom-made LED boards, each of which have two distinct channels, with associated coloured diodes. The two types of channels and diodes are a full spectrum white channel and a red channel. The white channel spectrum contains a large portion of red and blue light with wavelengths of 620-750 nanometers and 400-500 nanometers, respectively. These wavelengths are used in initializing photosynthesis in the plants grown in the device. The white channel also has a portion of yellow and green light with wavelengths between 550-580 nanometers that allows for penetration of light deeper into the canopy of the growing plants, increasing the productivity of the device and easing the strain of the lights on consumers' eyes.

The red channel contains red, as well as far-red light with a wavelength of 700-800 nanometers. This channel has two purposes; the first of which is to increase the proportion of red light that certain plant species will receive, as certain species need higher proportions of red light to grow optimally. The second purpose of this channel is to use the far-red portion of the visible light spectrum to trigger flowering, blooming, and/or fruiting in certain plant cultivars as far-red light is an environmental cue for many flowing and fruiting plant cultivars to initiate the previously stated processes. The two light channels utilized correctly can successfully grow a wide variety of plant cultivars in the device, as much of experimentation has supported.

Fogponics System

FIG. 1 illustrates, in a schematic diagram, an example of a fogponics system 100, in accordance with some embodiments. The fogponics system 100 comprises core components 110. The core components 110 comprise fog functionality 114 and a lighting system 116, such as light emitting node (LED) strip lighting. Other components may be added to the fogponics system 100, such as an optional rack and pinion hybrid 112. An example of a rack and pinion hybrid is described in U.S. Patent Application No. 63/028,269, entitled FOGPONICS APPARATUS, SYSTEM AND METHOD.

Table 1 shows an example of components in a fogponics system 100.

TABLE 1

Fogponics System Components

| Part # | Part Name | Description | Qty |
| --- | --- | --- | --- |
| Raspberry Pi Zero W V1.1 | Raspberry Pi | Micro Computer | 1 |
| GS-2IN1600x16GB-E | 16GB Memory card | Memory card for Raspberry pi | 1 |
| 40 Pin Headers | Headers | | 1 |
| B07PV9SYLV | Water Sensor | | 1 |
| SEN0244 | TDS Sensor | Gravity: TDS Sensor | 1 |
| B07TJN2FJ7 | Atomizer Ultrasonic Air Fogger | Fogger | 1 |
| LRS-150-24 | Meanwell Driver 24 V | 24 V DRIVER | 1 |
| | 3.5 Inch Raspberry pi | SunFounder | 1 |
| | Liquid dosing pump | INTLLAB 12 V DC | 1 |
| P78E05-1000 | DC-DC Non isolated 5 V | | 1 |
| P783F-Q24-S12-S-ND | 12 V DC-DC | | 1 |
| IRFZ44NPBF | Mosfet | | 3 |
| 1528-1228-ND | Humidifier & temp sensor | | 1 |
| 1738-1257-ND | Waterproof Temp sensor | Gravity | 1 |
| FG20X7S1H106KRT06 | Cap Cer 50 V 10 uF | | 2 |
| FG24X5R1E226MRT06 | Cap Cer 50 V 22 uF | | 1 |
| K270J15C0GF5TL2 | Cap Cer 50 V 227 uF | | 2 |
| MCP3008-I/P | IC ADC | | 1 |
| | APT-CV2-VA | | 1 |
| | Light Engines | | 1 |

Figure 2:
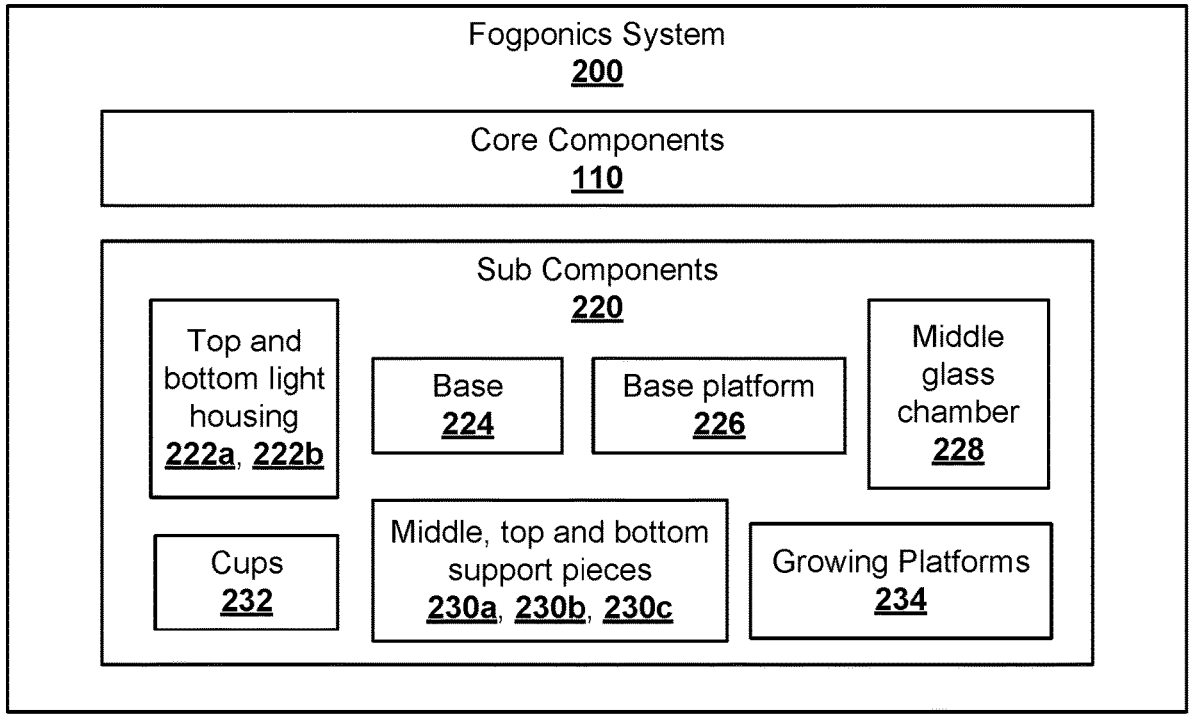
FIG. 2 illustrates, in a schematic diagram, another example of a fogponics system, in accordance with some embodiments.

FIG. 2 illustrates, in a schematic diagram, another example of a fogponics system 200, in accordance with some embodiments. The fogponics system 200 comprises the core components 110 and sub components 220. The sub components 220 may comprise a top 222a and bottom 222b light housing, a base 224, a base platform 226, a middle glass chamber 228, middle 230a, top 230b and bottom 230c support pieces, at least one cup 232 and at least one growing platform 234. In some embodiments, the base platform comprises acrylic parts. Other components may be added to the system 200.

In some embodiments, an example of a fogponics assembly comprises an liquid crystal display (LCD) screen interface, an electrical housing, an electrical housing cover/lid, a PCB motherboard/electrical components, a fan, LED lights, at least one plant cup/pod, a central housing component, windows with hinge for accessing the plants/keeping in as much fog as possible and allowing for oxygen intake when necessary, an internal cup housing for unit, a water reservoir, a nutrient reservoir and a reservoir chamber/base.

FIG. 3 illustrates, in an exploded component view, an example of a fogponics system assembly 300, in accordance with some embodiments. The assembly 300 comprises an liquid crystal display (LCD) screen interface 302, an electrical housing 304, an electrical housing cover/lid 306, a PCB motherboard 308, a fan 310, LED lights 312, at least one plant cup/pod 314, a central housing component 316, windows 318 with hinge for accessing the plants/keeping in as much fog as possible and allowing for oxygen intake when necessary, a main body structure 320, a water reservoir 322, and a reservoir chamber/base 324. Other components may be added to the assembly.

In some embodiments, a rack and pinion along with aluminum rods may constitute a foundation and core of a fogponics assembly. For example, the rack and pinion hybrid 112 and aluminium rods may be mounted on an axis for rotational motion; comprise opposite, yet parallel, racks for symmetrical movement; and may be telescoping in three parts as it is the core for each segment (top, middle and bottom). A gear and motor may be set in the middle of a middle aluminium tube. Rotates on axis to prevent it from moving except in a rotational motion. The racks may be placed opposite but parallel to each other in their respective grooves so when the motor spins clockwise, the gear will cause the racks to move away from each other, and anti-clockwise to bring them back in.

FIGS. 3B to 3G illustrate, in an exploded component views, another example of a fogponics system assembly 350, in accordance with some embodiments. The fogponics system 350 comprises one or more reservoir caps 352, a top housing 354, an electronics assembly 356, a root chamber assembly 358, a window assembly 360, a frame assembly 362, a bottom housing 364, a drawer reservoir 366, a fog channel 368, a fogger 370, a fogger float 372, an assembly thread 374, an assembly rim 376, a top assembly snap fit catch 378, a snap fit tab 380, a middle frame assembly 382, and a bottom housing snap fit catch 384. Other components may be added to the assembly 350.

Figure 3A:
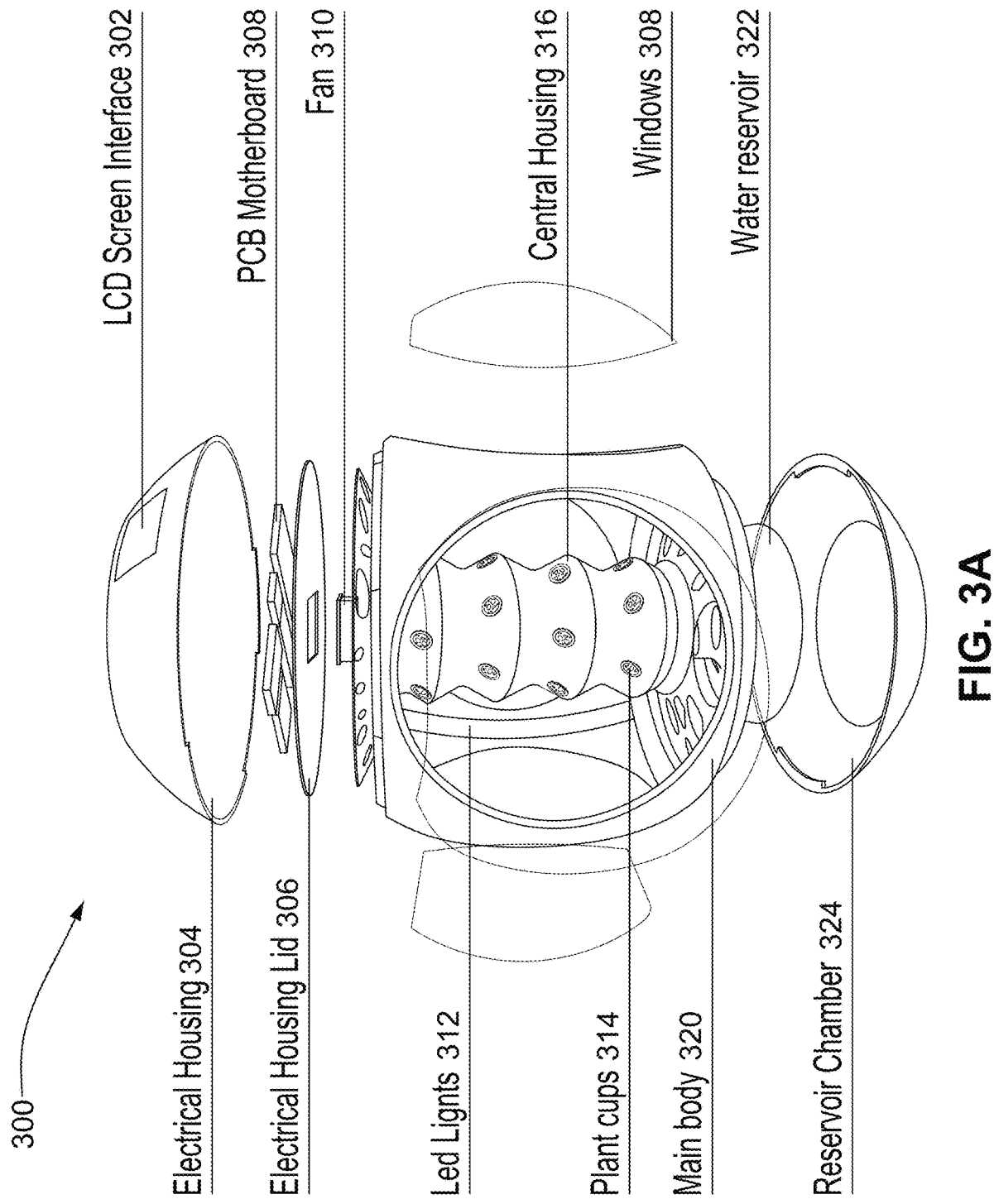
FIG. 3A illustrates, in an exploded component view, an example of a fogponics system assembly, in accordance with some embodiments.
Figure 3D:
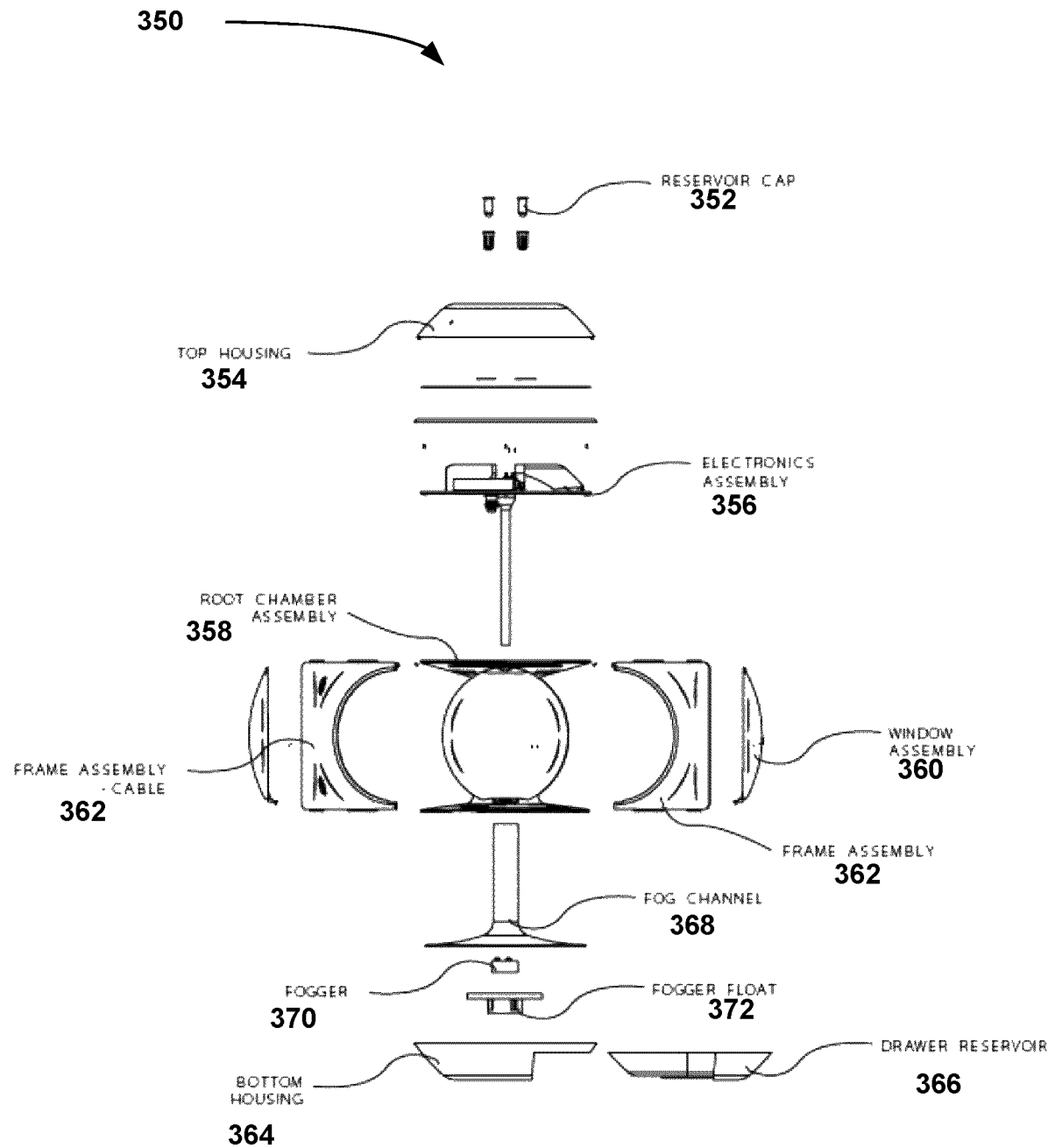
Figure 3E:
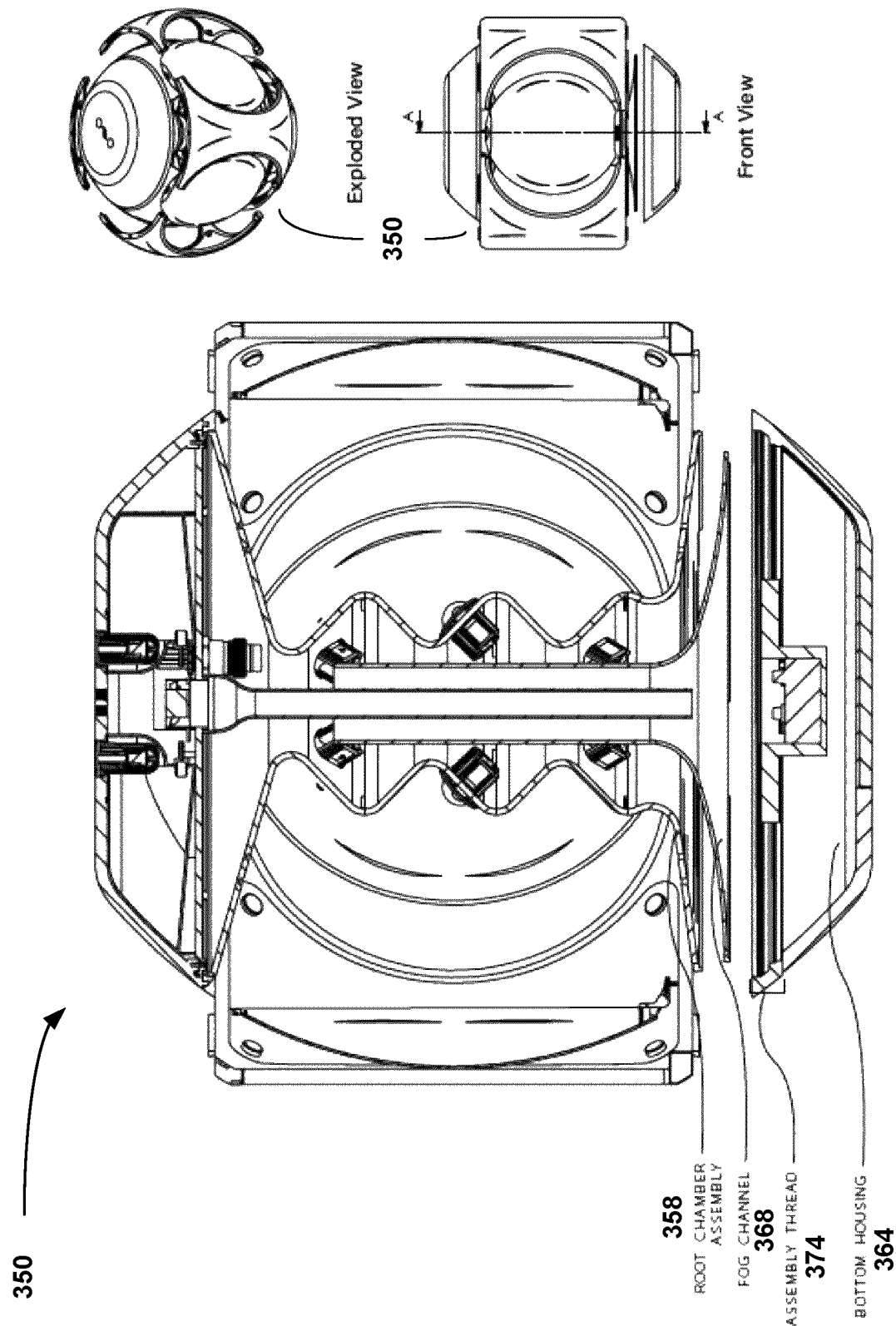

With reference to FIG. 3E, in some embodiments, to assemble the base housing 364 to the fog channel 368 and root chamber assembly 358, the assembly thread 374 is designed into the bottom housing 364. A smaller diameter of thread 374 (lower) may correspond to the fog chamber 368 diameter. A larger diameter of thread 374 (upper) may correspond to the root chamber assembly 358 diameter. The fog chamber 368 may be screwed in first, followed by the root chamber assembly 358.

Figure 3F:
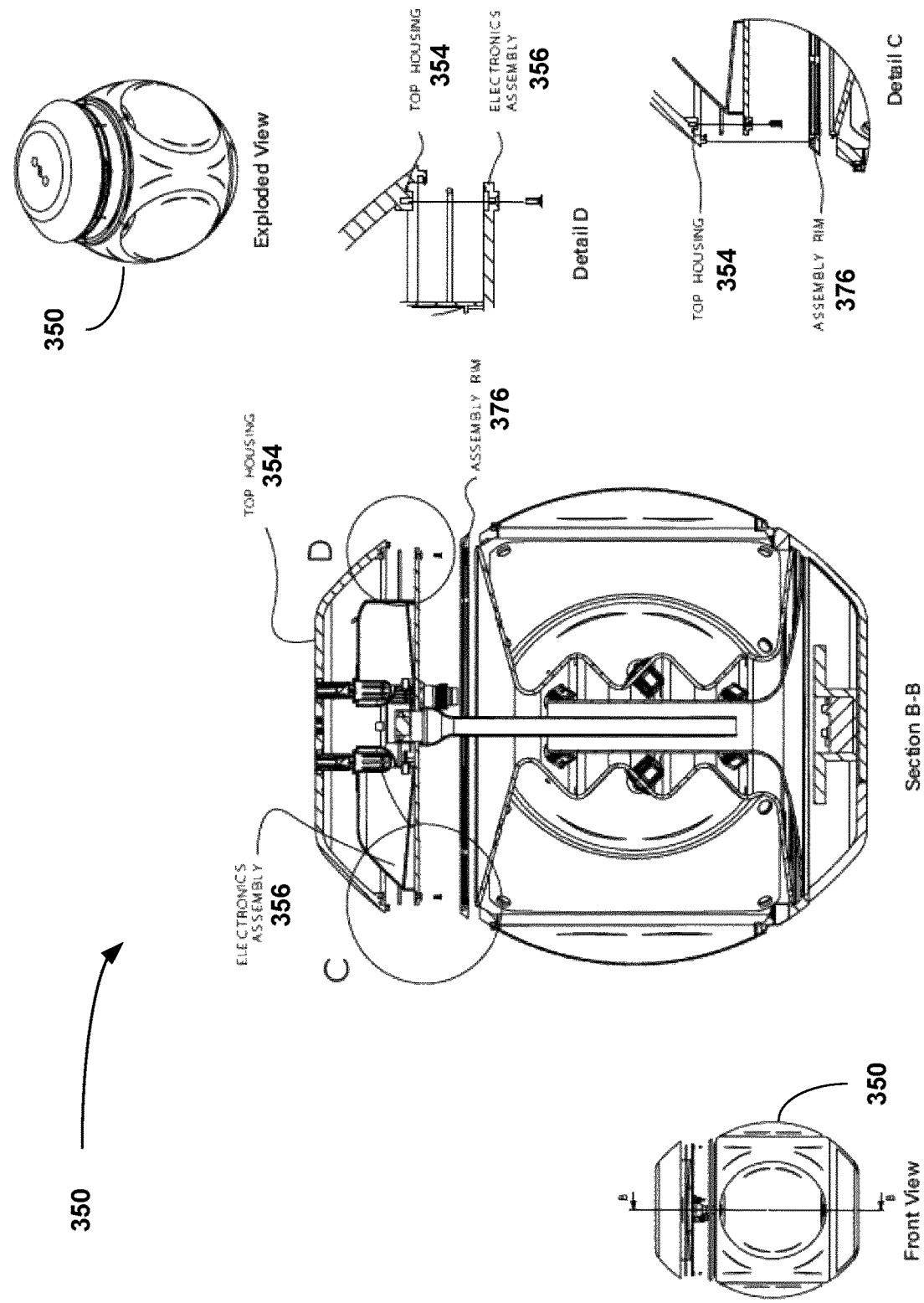

With reference to FIG. 3F, in some embodiments, to assemble the top housing 354 to the electronics assembly 356 and the root chamber assembly 358, the assembly thread 374 may be designed into the assembly rim 376. Fastener points may be designed into the top housing 354 and electronics assembly 356. The electronics assembly 356 may be fastened to the top housing 354 (see Detail D). The combined electronics assembly 356 and top housing 354 may then be secured to the assembly rim 376 via snap fit taps (see Detail C). A larger diameter of thread 374 (lower) may correspond to the root chamber assembly 358 diameter. The root chamber assembly 358 may then be screwed in.

Figure 3G:
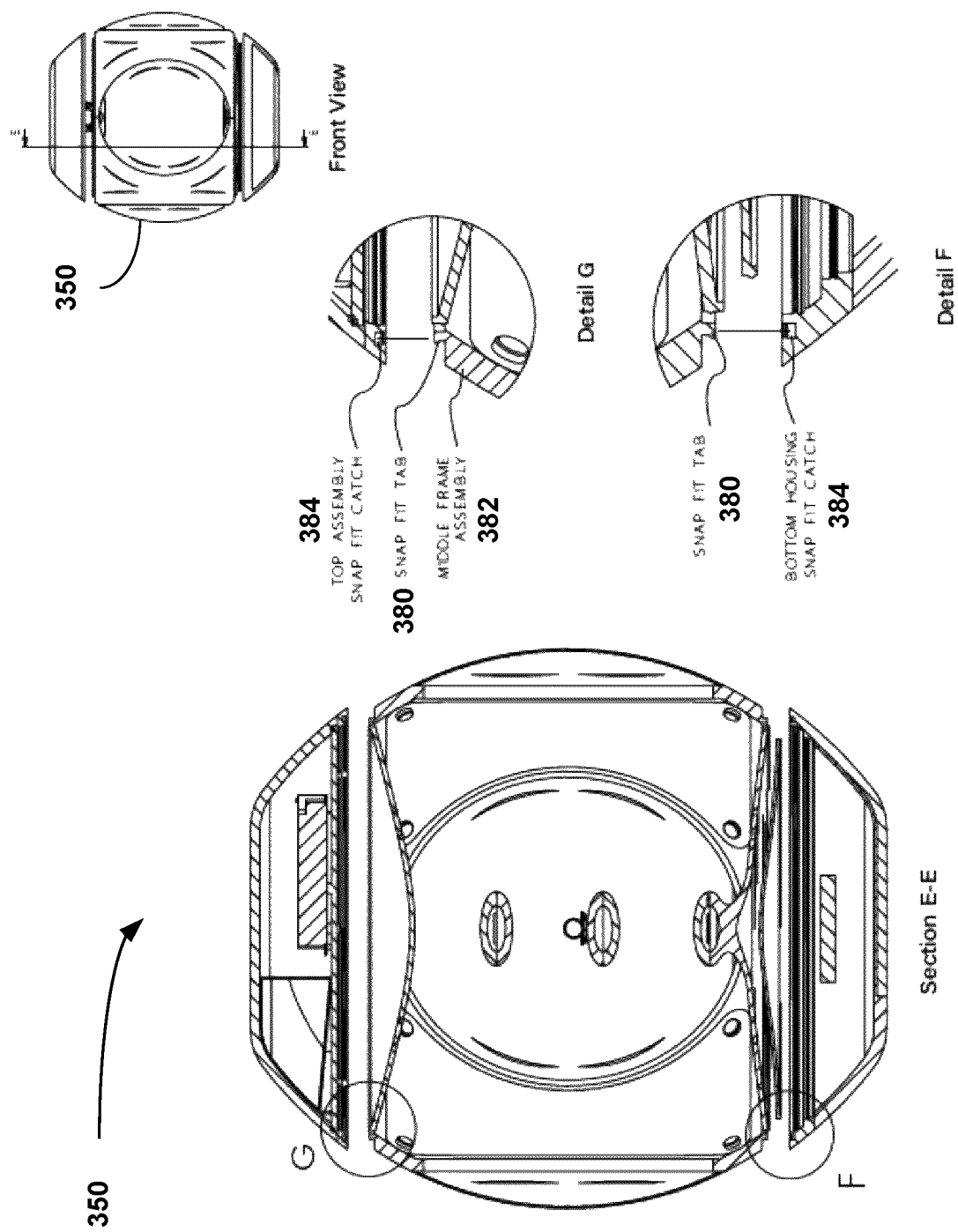

With reference to FIG. 3G, in some embodiments, to assemble the top assembly 354 and bottom assembly 364 to the middle frame assembly 382, the middle frame assembly 382 may be designed with snap fit tabs 380 which insert into grooves designed into bottom housing part 364 and top rim part 376. Snap fit tabs 380 of the middle frame assembly 382 may be inserted into snap fit catches 384 of the bottom housing 364 (see Detail F). The top assembly 354 may then be placed on top of the middle frame assembly 382 with the snap fit grooves aligning with the snap fit tabs 380 (see Detail G).

Figure 4:
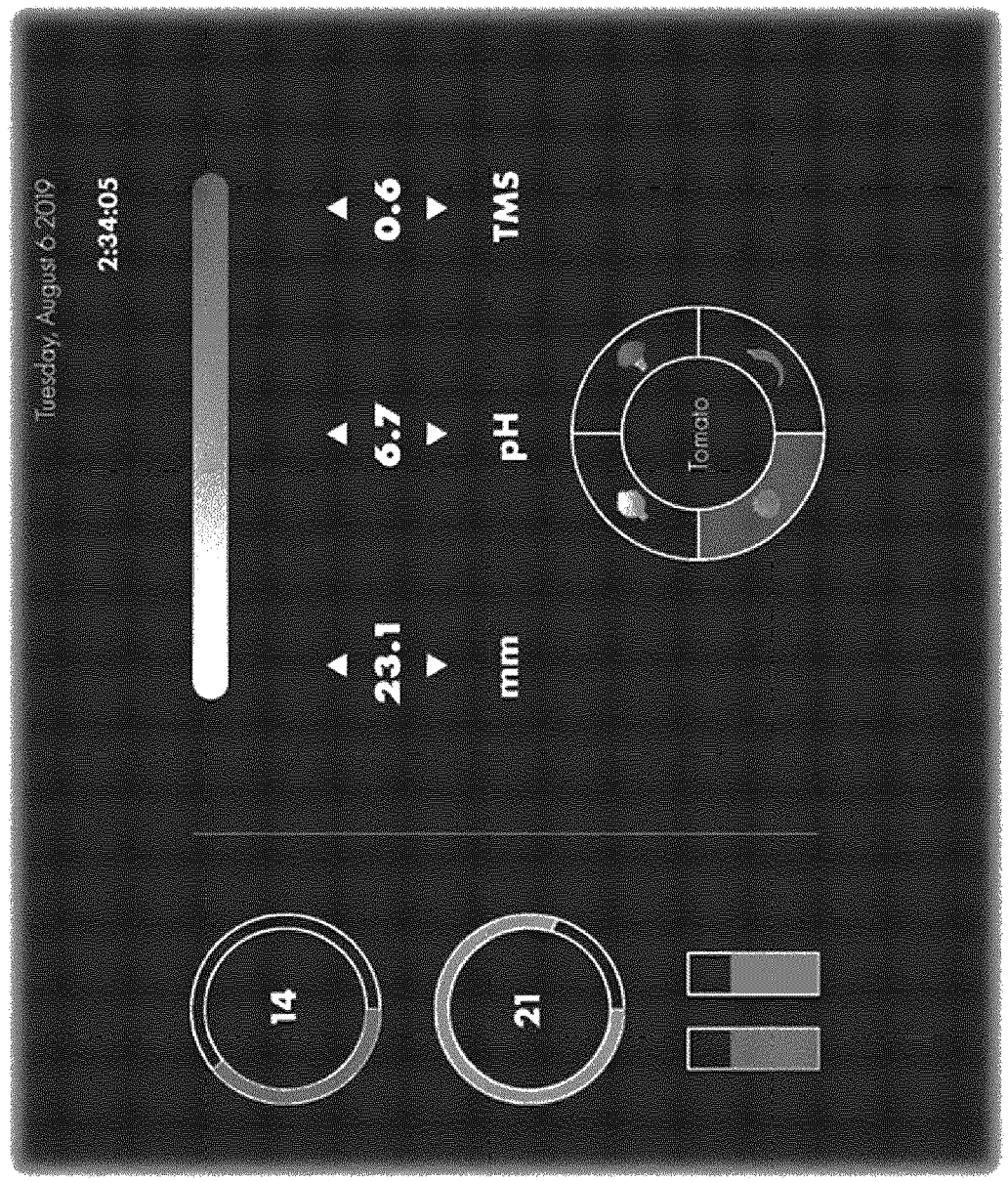
FIG. 4 illustrates, in a screenshot, at example of an LCD user interface, in accordance with some embodiments.

FIG. 4 illustrates, in a screenshot, at example of an LCD user interface 302, in accordance with some embodiments. In some embodiments, the LCD will be used as a user interface 302 to record values in a user experience user interface (UXUI) design. In some embodiments, software will incorporate an EC value, humidity percentage, water temperature, LED dispersion adjustability, more settings and customization features.

Figure 5A:
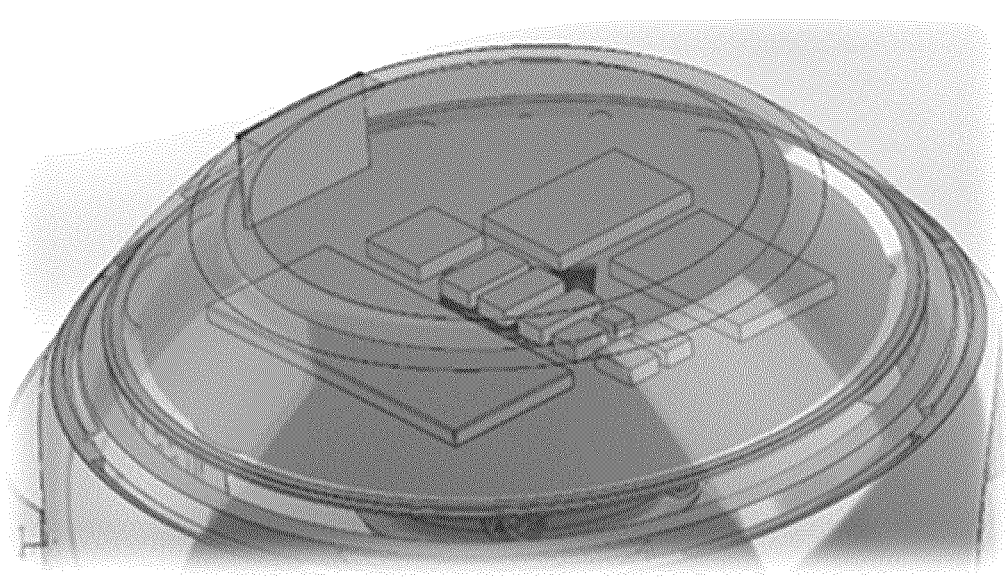
FIG. 5A illustrates an example of electrical components and a fan, in accordance with some embodiments.
Figure 5B:
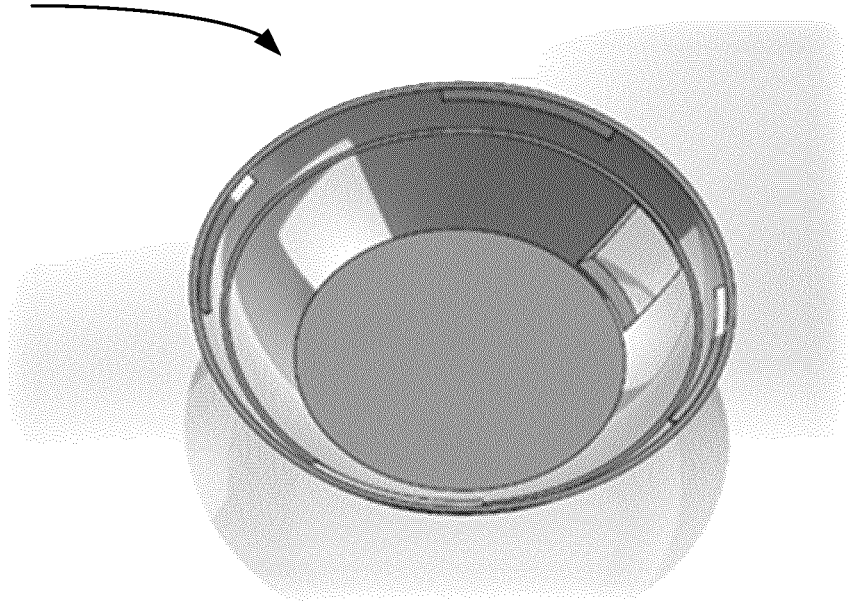
FIG. 5B illustrates an example of top lid space, in accordance with some embodiments.

FIG. 5A illustrates an example of electrical components and a fan, in accordance with some embodiments. FIG. 5B illustrates an example of top lid 306 space, in accordance with some embodiments. In some embodiments, an electrical component top may be inside the top housing 304 as shown in FIG. 5A. The top lid 306 will have housing and bosses to prevent components from moving. There are two holes located on the top to refill the water and nutrient reservoirs, in which are located on the top housing. Two internal tubes will allow the liquids to flow down into the bottom housing, where a larger water reservoir is located. The liquids are released from the top to the bottom with a liquid dosing pump. Component names are shown in Table 1.

Figure 5C:
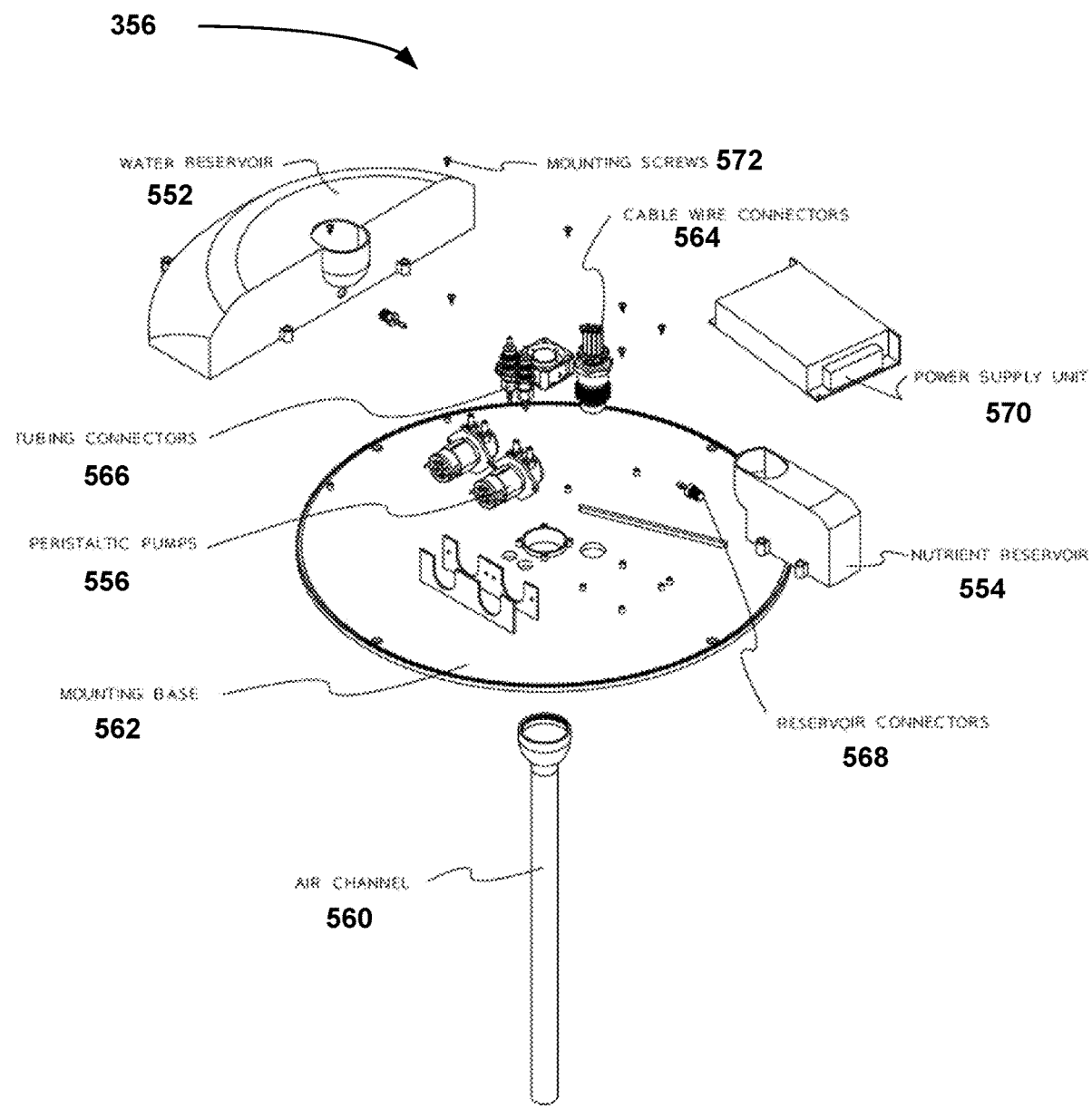
FIG. 5C illustrates another example of an electronic assembly, in accordance with some embodiments.

FIG. 5C illustrates another example of an electronic assembly 356, in accordance with some embodiments. The electronic assembly 356 may comprise a water reservoir 552, a nutrient reservoir 554, a peristaltic pump 556, a fan 558 (e.g., a direct current fan), an air channel 560, a mounting base 562, a cable wire connector 564, tubing connectors 566, reservoir connectors 568, a power supply unit 570, and mounting screws 572. The electronic assembly 356 may be designed in a matter where the nutrient reservoir 554 and water reservoir 552 may be drawn from by the peristaltic pumps 556, individually drip feeding the liquids to the drawer reservoir 366. This allows the amounts to be properly measured for an effective nutrient solution.

Figure 5D:
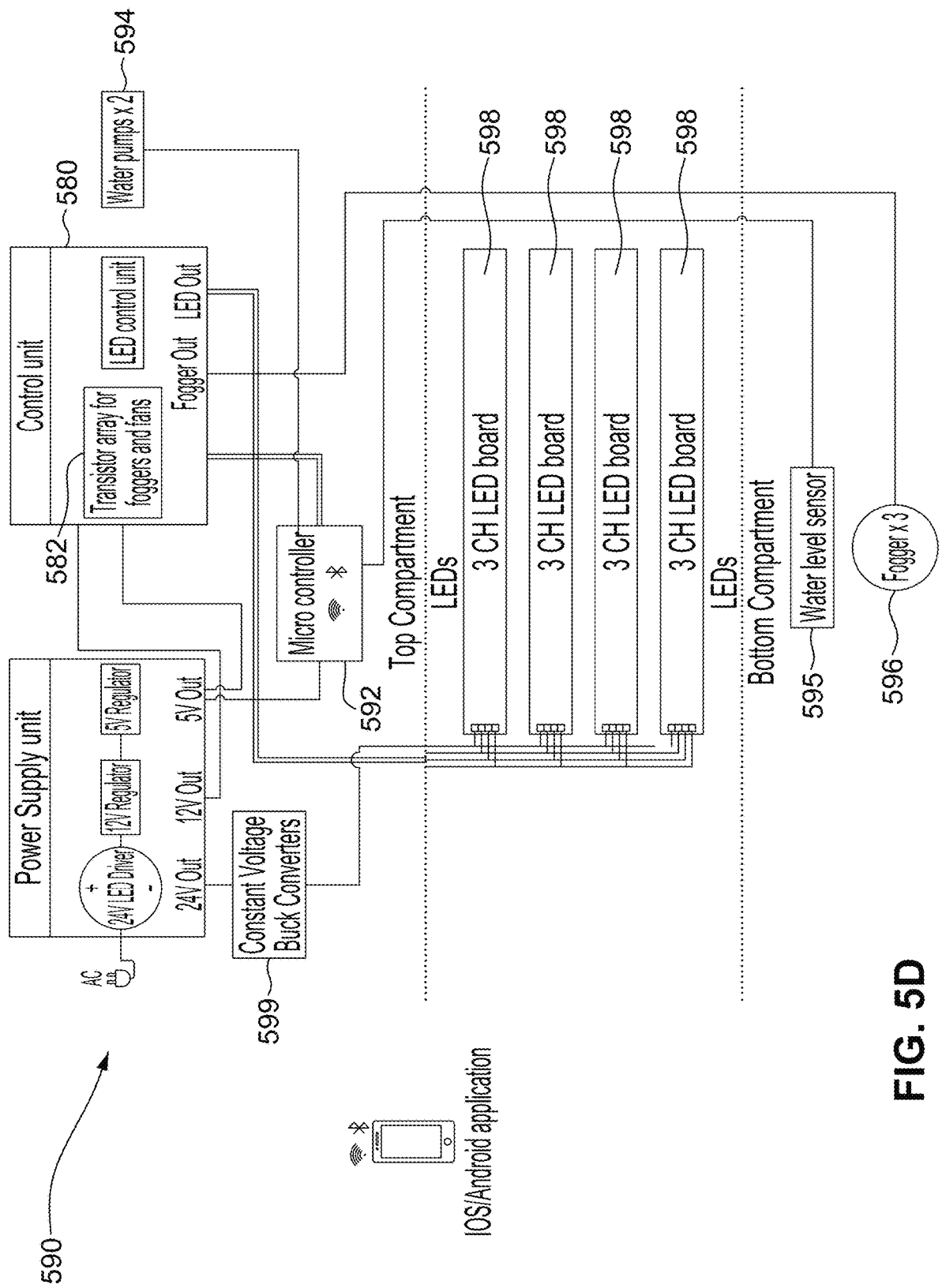
FIG. 5D illustrates an example of a control system, in accordance with some embodiments.
Figure 6A:
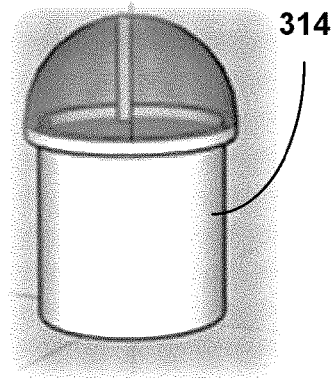
FIGS. 6A to 6E illustrate, in render drawings, an example of a cup, in accordance with some embodiments.
Figure 6B:
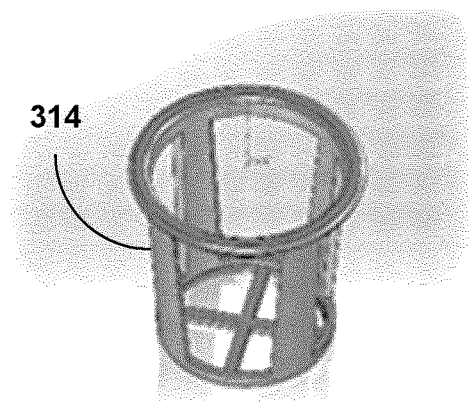
Figure 6C:
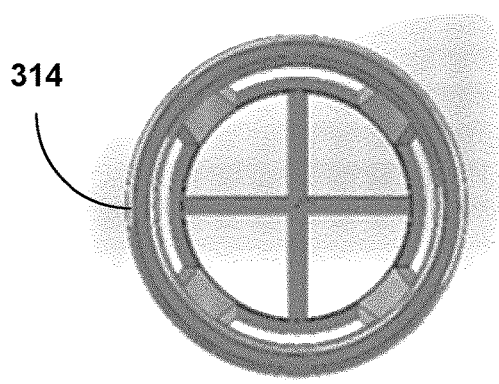
Figure 6D:
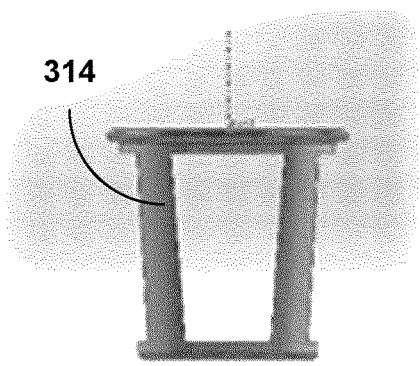
Figure 6E:
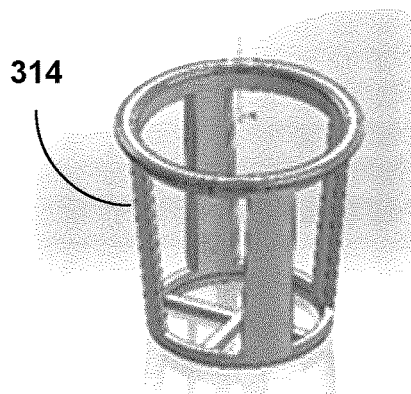

FIG. 5D illustrates an example of a control system 590, in accordance with some embodiments. The device 350 may be controlled by a microcontroller 592. The microcontroller 592 may receive user input from the user via wireless (e.g., Bluetooth or Wi-Fi), or optionally wired, communication. The microcontroller 592 may be preprogrammed with default configurations that will allow the device to run in its default settings. The microcontroller 592 may be able to control the LED lights 312 ON/OFF as well as control their intensity. The microcontroller 592 may control liquid dosing pumps 594 in order to allow mixing of water and nutrients. The microcontroller 592 may control a fan frequency, foggers 596 and speed. The microcontroller 592 may receive input from a water sensor 595 and use the information to release water from the reservoirs 552 or display a notification message that water is low. A clock may also be present that allows the microcontroller 592 to schedule of ON/OFF times as well as different functionalities.

LED boards 598 may have different LEDs 312 to allow for a custom spectrum of light. A constant voltage buck converter 599 may allow for control of the intensity and actuating the ON/OFF state of the LEDs 312. A control unit 580 may include an array 582 of gates and transistors controlled by the microcontroller 592 that allows for the control of the LEDs, pumps 594 and foggers 596.

In some embodiments, at the bottom of the device 350, there is a chamber-like component that holds nutrient-rich water as well as submerged foggers. This portion of the device allows for a custom-strength nutrient solution to be mixed and used to feed the plant roots with the nutrient solution in the form of microscopic nutrient-rich particles.

In some embodiments, the device 350 has a water tank, as well as a separate nutrient tank in the top of the device that allows for the storage of water and nutrients, which increases the amount of time between the user having to fill the water or nutrients. These tanks have associated valves that release set amounts of volume of the water or nutrients, which travels through the fan/water/nutrient tube down into the fogger chamber.

In some embodiments, the fogger chamber has a water level sensor, whose position indicated the exact volume of liquid in the fogger chamber. Based on the position of the water-level sensor, the volume of water added to the fogger chamber from the water tank, as well as predetermined nutrient concentration equations, allows for a specific volume of concentrated nutrient solution to be added from the nutrient tank to the fogger chamber to maintain the correct concentration of nutrients that are optimal for a specific plant cultivar.

In some embodiments, there three ultrasonic foggers that contain fogger plates that vibrate at a frequency of approximately 1600-1700 kilohertz (kHz). The foggers can be turned on or off and their cycles of function are controlled by the electronic control system. The fogger plate that vibrates at a frequency of 1600-1700 kHz creates nutrient-rich water droplets with an average diameter of approximately 3-30 micrometers (μm). A high volume of these microscopic nutrient-rich water particles are able to be absorbed by the plant roots very efficiently and promote the development of microscopic root hairs that increase the efficacy of water and nutrient absorption by the plant roots.

In some embodiments, there is a fan in the top section of the device that is controlled by the electronic control system. The fan can be completely turned off and when it is on, the speed of the fan can be controlled as well. It works in tandem with the ultrasonic foggers, controlled by the electronic control system to appropriately create, transport, and provide the correct amount nutrient-rich fog to roots of the plants for the correct amount of time.

FIGS. 6A to 6E illustrate, in render drawings, an example of a cup 314, in accordance with some embodiments. In some embodiments, cups 314 that will be fitted into the root chamber will take the form of a structural framework which will house the growing medium used to germinate the plant seeds and provide structural support for the plants as their edible shoot systems grow towards the LED lights. There will be holes in these cups as well to allow the roots of the plants to grow into the internal root chamber. This will allow the roots to absorb the nutrient-rich fog particles, supplying the plants with the essential water and nutrients they need to grow. Alternatively, the cups will only have holes on the bottom and have smooth sides for cheaper production. These cups will be one-time use as they come with a peel cover which, once removed, display the rockwool inside with the seed inserted.

In some embodiments, a small pod containing the seeds for growing plants will have the correct shape to snuggly fit into the cups put into the device at the start of each growing cycle. These cups may be used to germinate the seeds that will grow into the edible plants and will also provide support for the plants as they grow and become top-heavy. In some embodiments, they will be made from rockwool, a mineral fiber spun out of melted basalt rock and recycled slag. This germination medium may be used for its ability to provide structural support to the plants and its ability to retain nutrient-rich water as well as small pockets of air, which are essential for the germinating seeds and the young plant roots to grow successfully. Other growing mediums may be used. Other possible growing medium options include custom-made 'smart-soil', coco coir or hydroponic sponges.

Figure 7A:
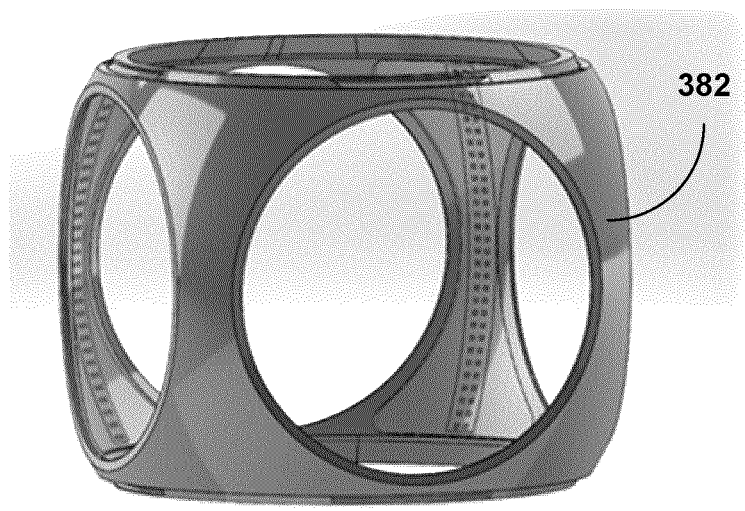
FIGS. 7A and 7B illustrate, in section views, an example of a middle component showing LEDs and a housing, in accordance with some embodiments.
Figure 7B:
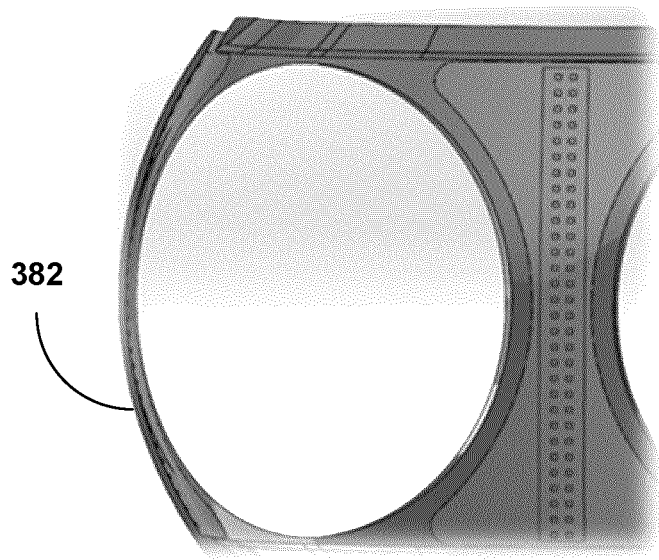

FIGS. 7A and 7B illustrate, in section views, an example of a middle component 382 showing LEDs and a housing, in accordance with some embodiments. The section views show the spacing for the LEDs to sit inside (component name in Table 1). These LED strips 312 may be custom made in triangular shapes or other shapes fitting in its allocated space.

Figure 8A:
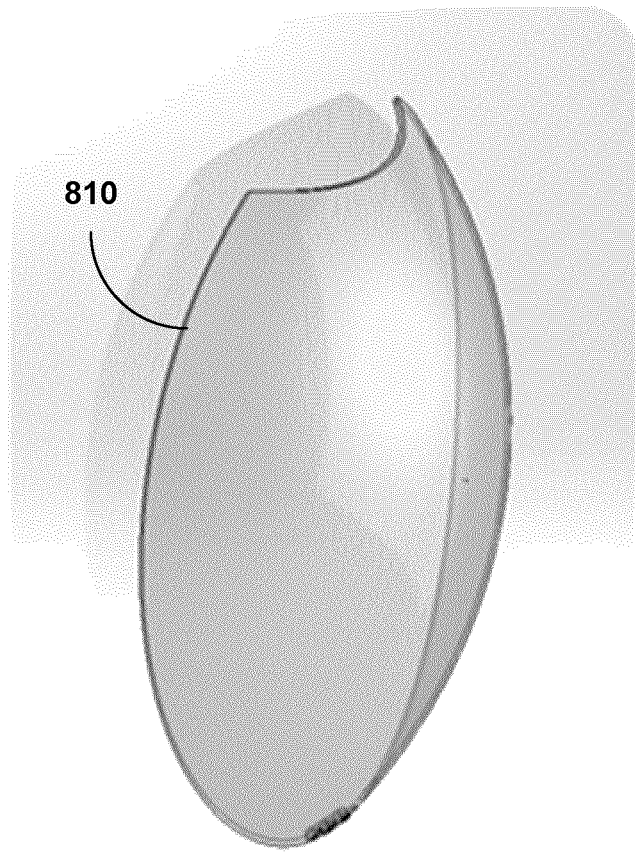
FIGS. 8A and 8B illustrate example windows, in accordance with some embodiments.
Figure 8B:
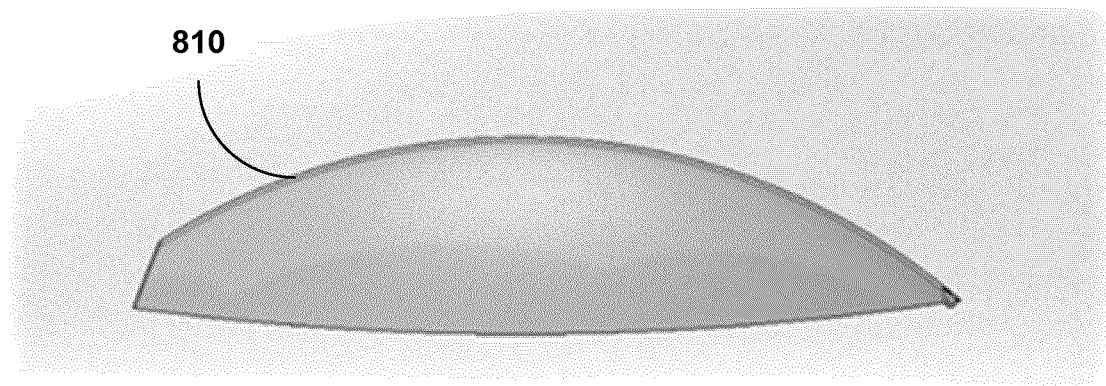

FIGS. 8A and 8B illustrate example windows 810, in accordance with some embodiments. The windows may include a hinge mechanism for opening/closing. The windows may comprise any material including plastic or glass. In some embodiments, the window design includes spacing either on top and/or sides to allow for oxygen to flow inside the device. The spacing design and surface area can potentially change. In some embodiments, windows 810 include one or more small holes that allow air into the plant area.

FIG. 8C illustrates several views of an example of a window assembly 360, 850, in accordance with some embodiments. A window assembly 360, 850 may comprise a window 810, a handle 820 and a metal washer 830. The window 810 may be designed with snap fit holes at the top to fasten the handle 820, and fastening points at the bottom for the hinge 840. The components may be assembled by snap fitting the handle 820 to the window 810, and then affixing the metal washer 830 to the handle 820 so as to act as a magnetic point for the frame (see Detail L).

Figure 8D:
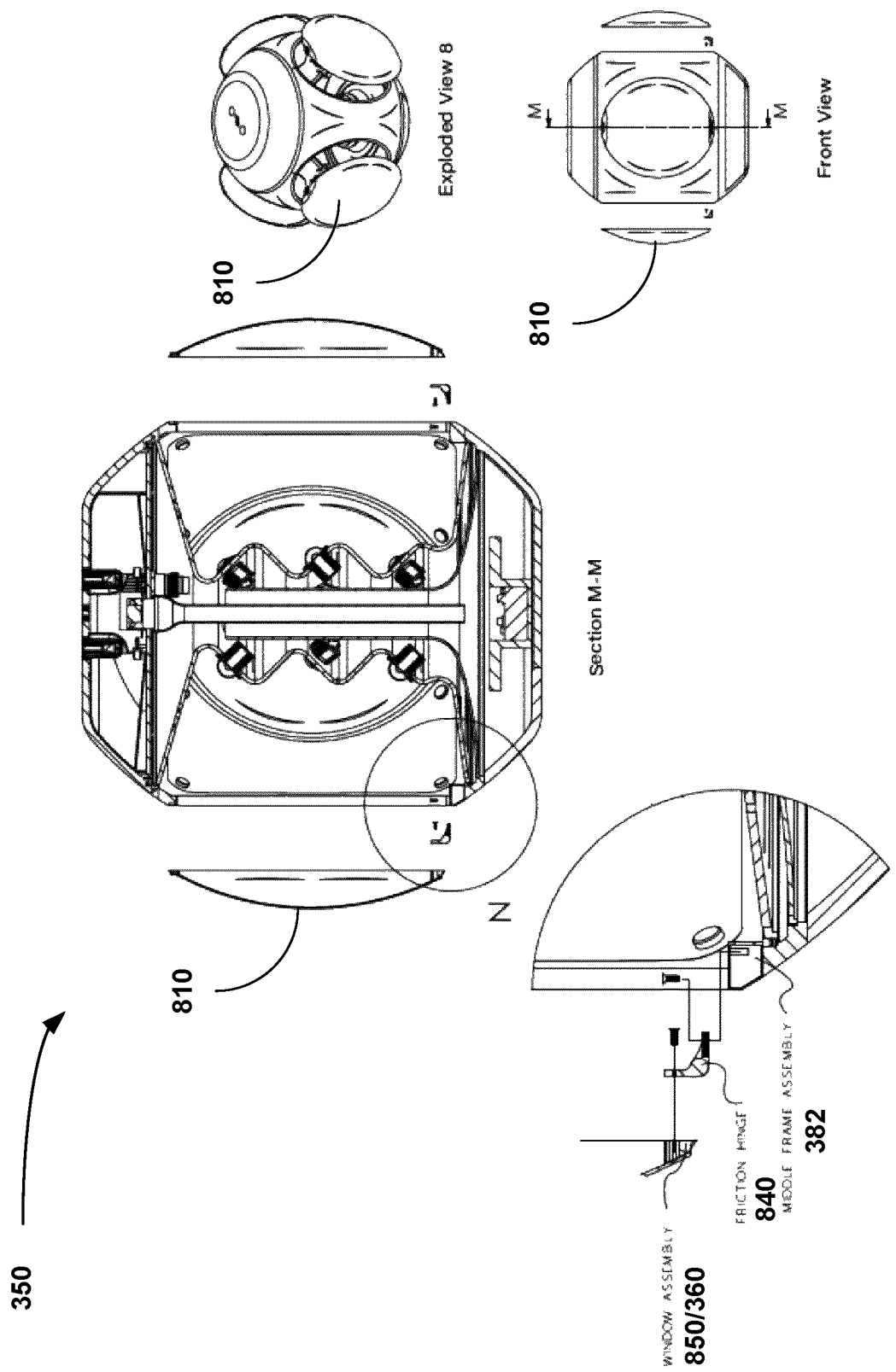
FIG. 8D illustrates an example of a window assembly assembled to a middle frame assembly, in accordance with some embodiments.

FIG. 8D illustrates an example of a window assembly 850, 360 assembled to a middle frame assembly 382, in accordance with some embodiments. Inn some embodiments, a window assembly 360, 850 may be joined with a friction hinge 840 and middle frame assembly 382 with screws (see Detail N). Two screws may join the hinge 840 to the window assembly 850, 360. Two screws may join the hinge and window assembly to the middle frame assembly 382.

Figures 9A, 9B:
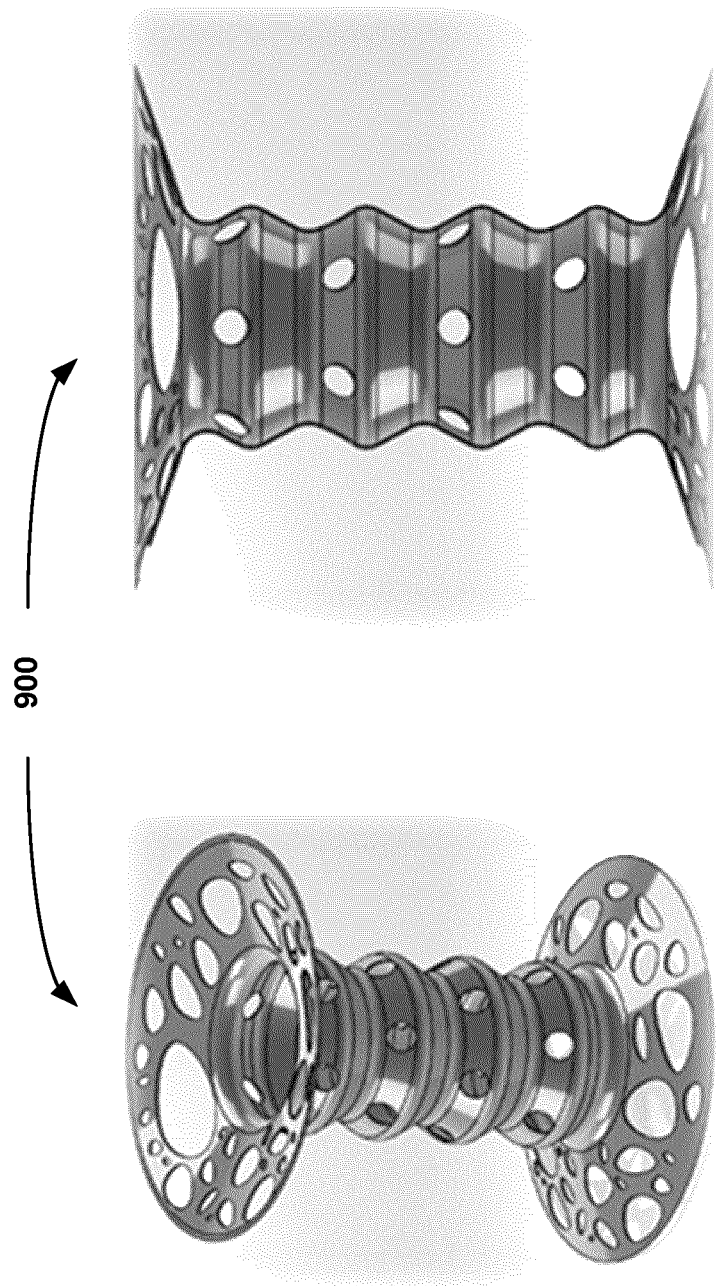
FIGS. 9A and 9B illustrate an example of a central housing, in accordance with some embodiments.

FIGS. 9A and 9B illustrate an example of a central housing 900, in accordance with some embodiments. In some embodiments, the spacing allows for the excess condensation water to drip into the bottom reservoirs to be reused as part of our sustainable condensation system. The part may be made in two moulds, the top and bottom will be split off the main body (one mould for two components) and the internal body will be split into half (one mould for two components). These may be assembled with screws or with snap fits. The cups will also sit in this section. Pods will slide into the holes, and stay attached as the top of the lip of the cups will be designed to be bent inwards to create an airtight/clicking fit.

Figure 9C:
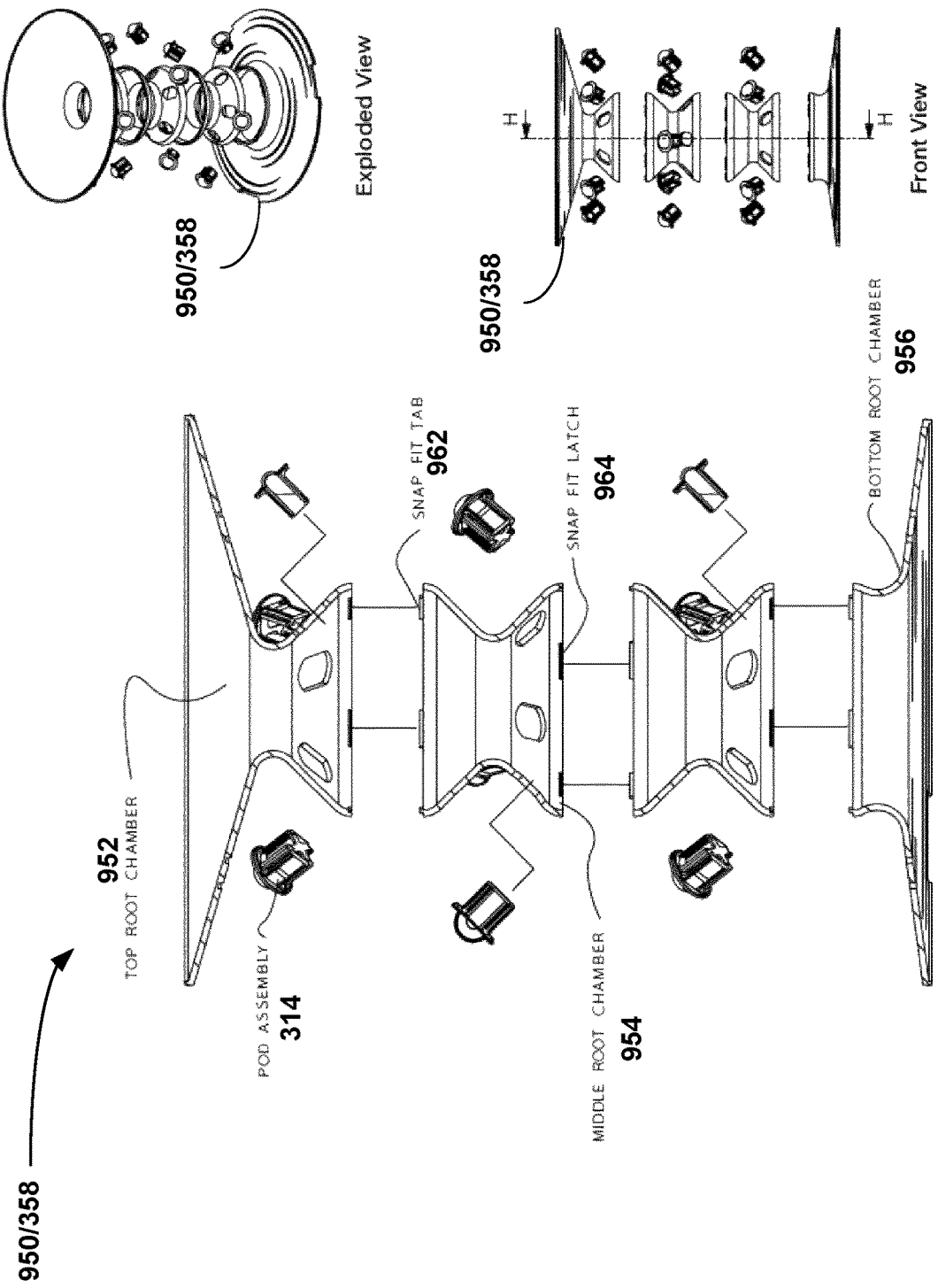
FIG. 9C illustrates another example of a central housing having a root chamber, in accordance with some embodiments.

FIG. 9C illustrates another example of a central housing 950 having a root chamber (sometimes referred to as a root chamber assembly 358), in accordance with some embodiments. The root chamber assembly 358 may comprise a top root chamber 952, at least one middle root chamber 954 and a bottom root chamber 956. A pod assembly 960 may be inserted in tabs in any root chamber 952, 954, 956. Snap fit tabs 962 may be designed on the bottom root chamber 956 and middle root chamber 954 with corresponding snap fit latches 964 designed on the middle root chamber 954 and top root chamber 952. It should be understood that the placement of the snap root latches 964 and corresponding tabs 962 may be placed in different positions. It should be noted that the root chamber 358 may be shaped to minimize space required for roots in order to maximize space for the plants to grow outside the root chamber 358.

In some embodiments, the snap fit latches 964 and tabs 962 on a middle root chamber 954 may be designed to be off set by an amount (e.g., approximately 36 degrees or other amount) to create an off set of pod 960 distribution around the circumference of the root chamber. Holes (or openings) are designed into the middle root chamber 654 and top root chamber 652 to fit a number (e.g., five) of pod assemblies 960 on the three (or more) levels. It should be understood that there may be different combinations of holes (or openings) to fit pod assemblies 960 on a plurality of levels, based on the dimensions of the root chamber assembly 358. The angle of the holes (or openings) may be set (e.g., to approximately 45 degrees) to reduce gravitational pull on plants as they grow from the pod assemblies 960. The root chamber 950, 358 may be assembled by aligning the snap fit tabs 962 to the snap fit latches 964 and then connect same, for example, in the order from bottom to top. Pod assemblies 960 may fit into the holes (or openings) of the root chamber assembly 950, 358 and snap lock into place. In operation, a root of the plant growing in an inserted pod 960 will be located within the root chamber assembly 358, 950, while the remaining portion of the plant will grow outside the root chamber 358, 950.

Figure 9D:
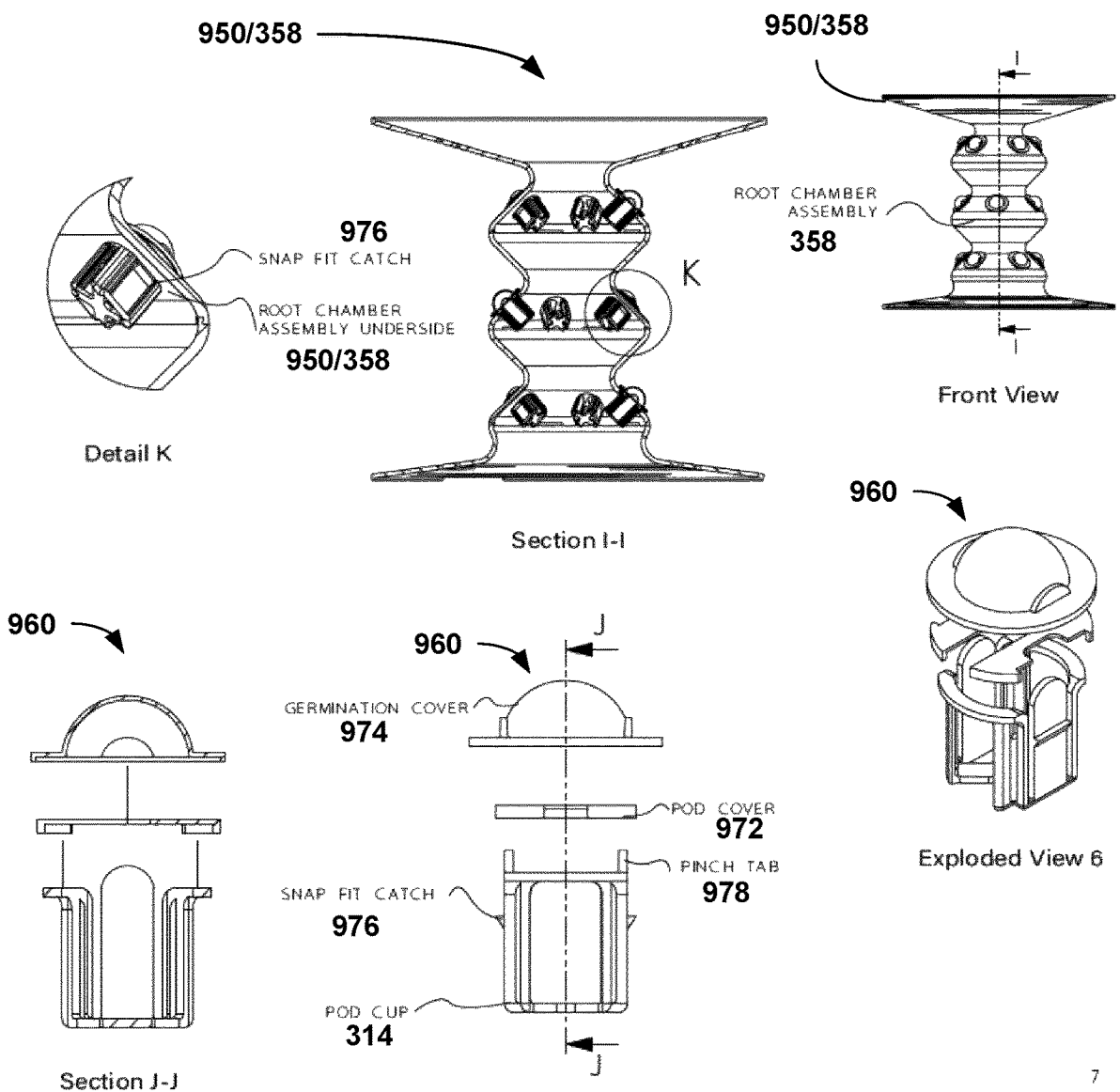
FIG. 9D illustrates an example of a pod assembly, in accordance with some embodiments.

FIG. 9D illustrates an example of a pod assembly 960, in accordance with some embodiments. The pod assembly 960 comprises a pod cub 314, a pod cover 972 and a germination cover 974. The components may be designed to snap fit on top of each other (see Section J-J). The pod cup 314 may be designed to snap fit into place when inserted into the root chamber assembly 950, 358. Snap fit catches 976 may be designed on either side and hold in place by catching on the under side of the root chamber assembly 950, 358. To release a pod assembly 360 from the root chamber assembly 950, 358, the germination cover 374 is first removed. The two tabs 378 are then pinched towards each other, bending so the snap fit catch 976 is clear of the underside of the root chamber assembly 950, 358. In some embodiments, the snap on configuration of the pod assemblies 960 preserves fog in the root chamber assembly 960 via reduction of dissipation due to the creation of a seal by the pressure of the snap on clips.

Figure 10A:
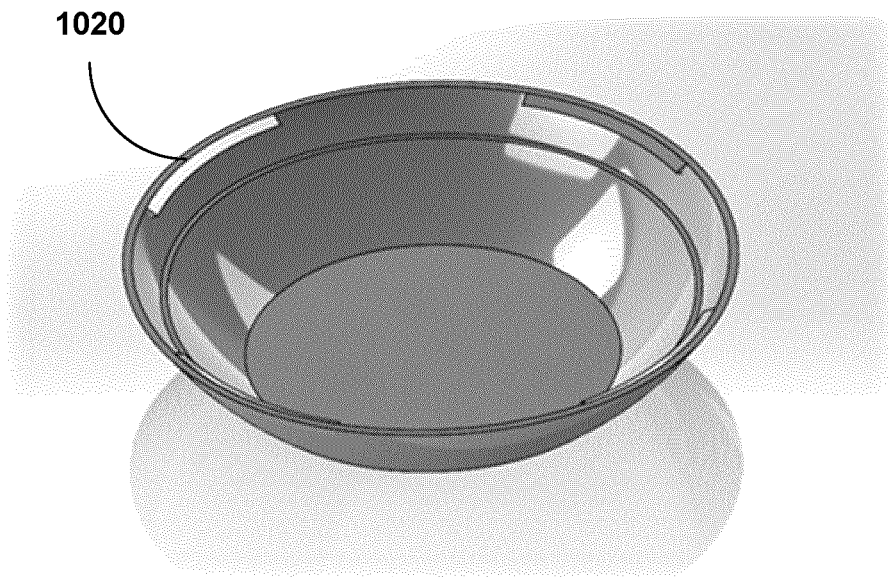
FIGS. 10A and 10B illustrate an example of a base and reservoir, in accordance with some embodiments.
Figure 10B:
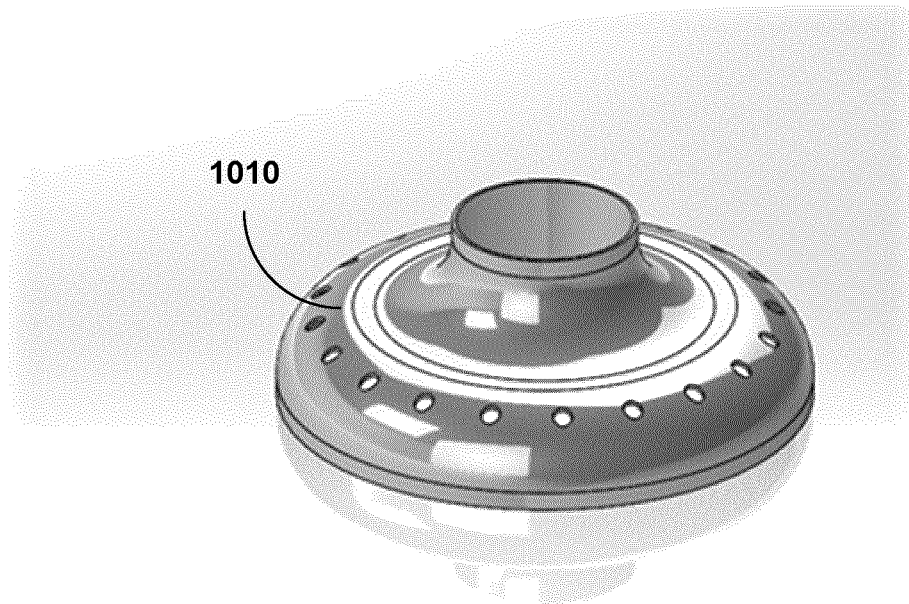

FIGS. 10A and 10B illustrate an example of a base 1010 and reservoir 1020, in accordance with some embodiments. In some embodiments, the base and reservoir are one piece. In some embodiments, there are two reservoirs: one for water and the other for nutrients. This section is purely for the reservoirs.

The water and nutrient solution may be poured from the top, where it will stay in an initial reservoir, and flow down to the bottom larger reservoir through two tubes. In the bottom, there may be a cylinder-like reservoir containing the ultrasonic foggers/piezoelectric transducers where the nutrient-mixed water will enter. Surrounding this mixing reservoir will be a larger water reservoir, where the tubes will be directing the water and nutrients from the top and the water condensation will flow down from the sides into this reservoir. The purpose is to prolong the refill time of the user by having a larger water reservoir (top and bottom) as well as reusing the water from condensation.

Figure 10C:
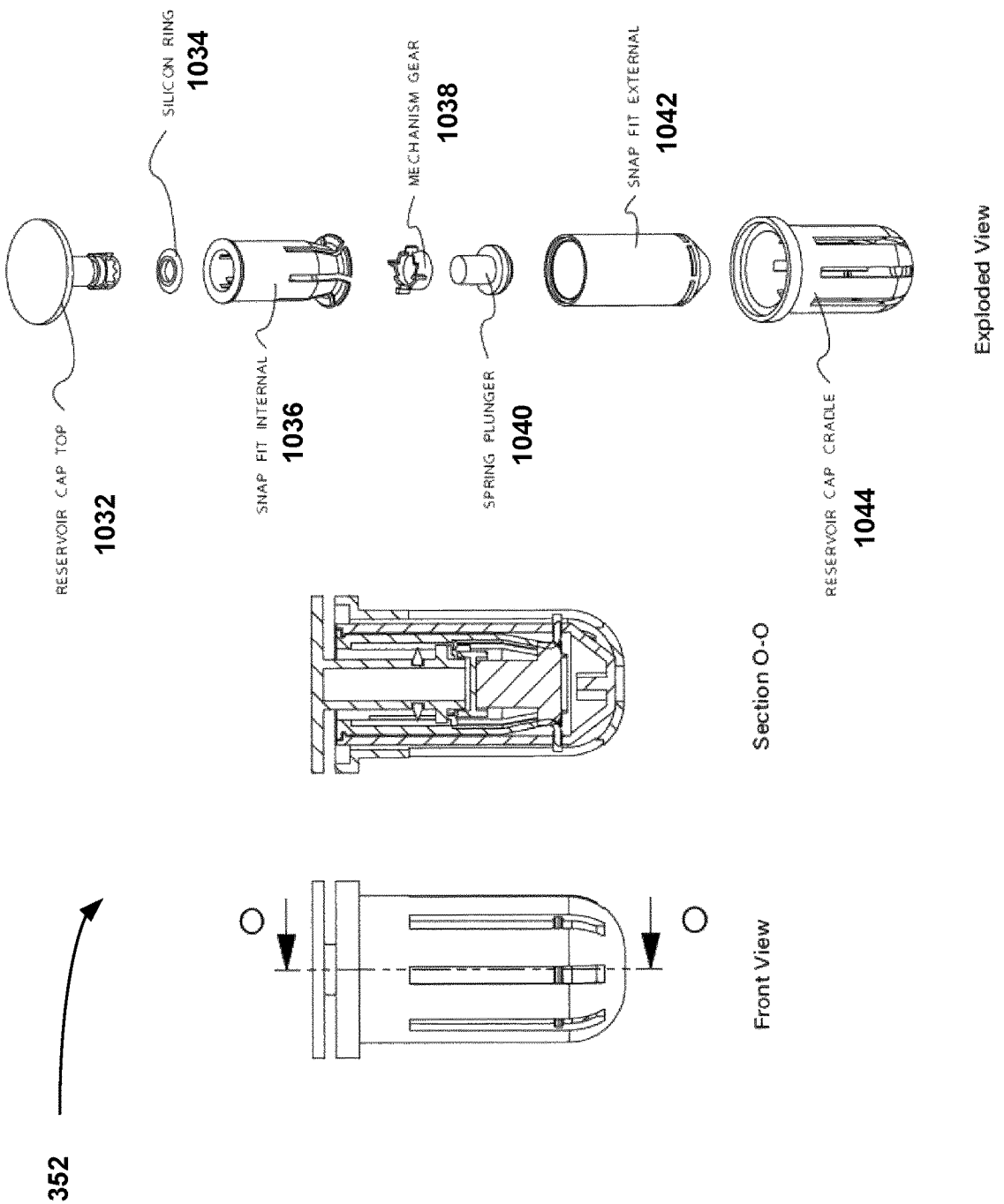
FIG. 10C illustrates an example of a reservoir cap, in accordance with some embodiments.

FIG. 10C illustrates an example of a reservoir cap 352, in accordance with some embodiments. The reservoir cap 352 may comprise a reservoir cap top 1032, a silicon ring 1034, a snap fit internal 1036, a mechanism gear 1038, a spring plunger 1040, a snap fit external 1042 and a reservoir cap cradle 1044. The reservoir cap 352 may be designed such that when the reservoir cap top 1032 is pushed down, it causes the mechanism gear 1038 to rotate, allowing it to travel further up and down the snap fit internal component 1036. As the mechanism gear 1039 travels, the spring plunger 1040 also moves up and down, with the assistance of the compression spring. As the spring plunger 1040 travels up and down the snap fit fins of the snap fit internal component 1036, it is pushed in and out, causing it to catch the grooves of the reservoir cap cradle 1044. When the fins are caught in the groove, the reservoir cap assembly 352 is fixed and does not move. To remove the reservoir cap 352, the reservoir cap top 1032 may be pushed, causing it to travel up and releasing the snap fit fins.

Figure 10D:
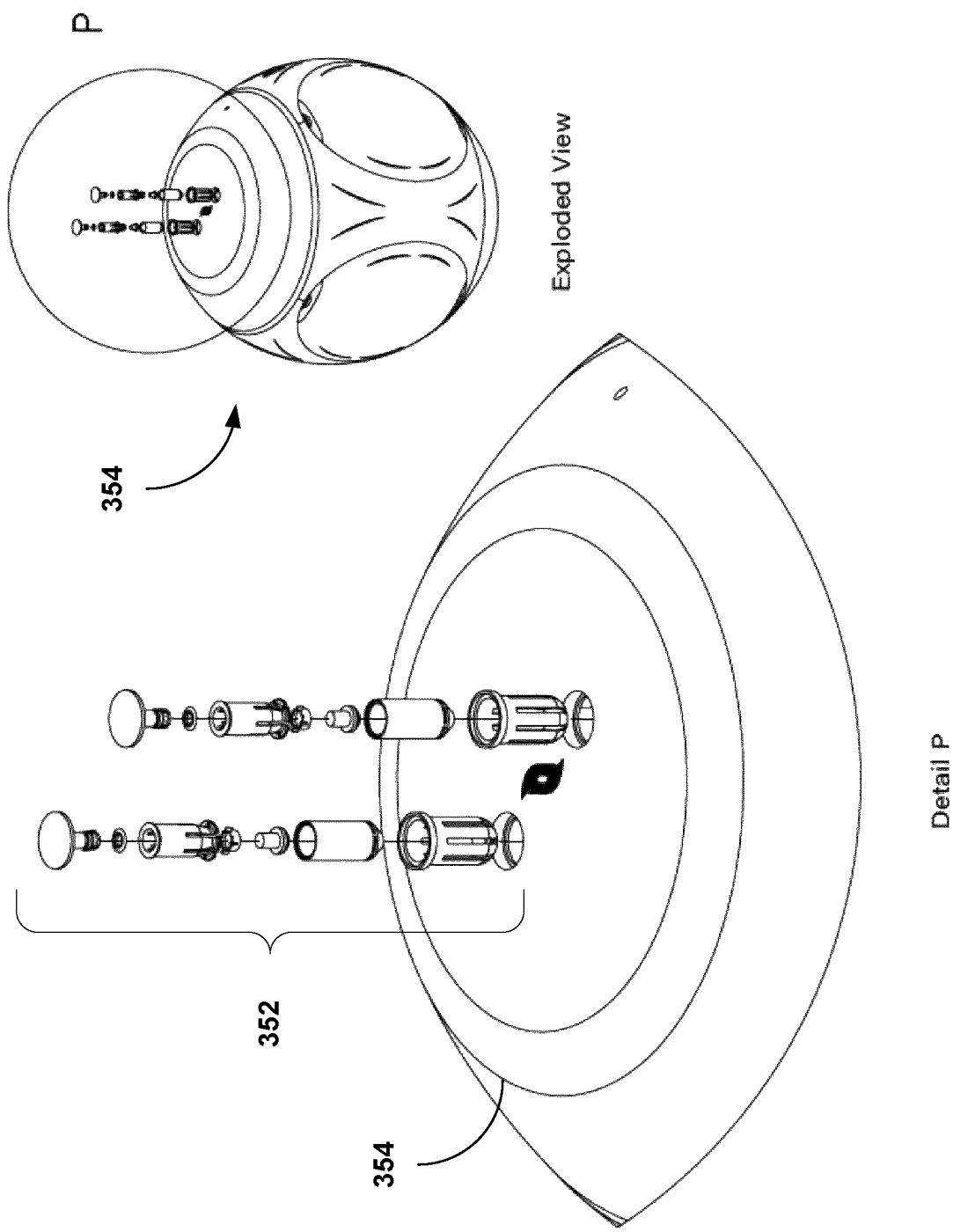
FIG. 10D illustrates an assembly of a reservoir cap assembly to a top housing, in accordance with some embodiments.

FIG. 10D illustrates an assembly of a reservoir cap assembly 352 to a top housing 354, in accordance with some embodiments. The reservoir cap assembly 352 may be installed by fixing the reservoir cap cradle 1044 into the top housing 354. The assembled reservoir cap assembly 352 may then be put into the reservoir cap cradle 1044. Pushing in and out will lock and unlock the reservoir cap 352 from the top housing 354.

Figure 11:
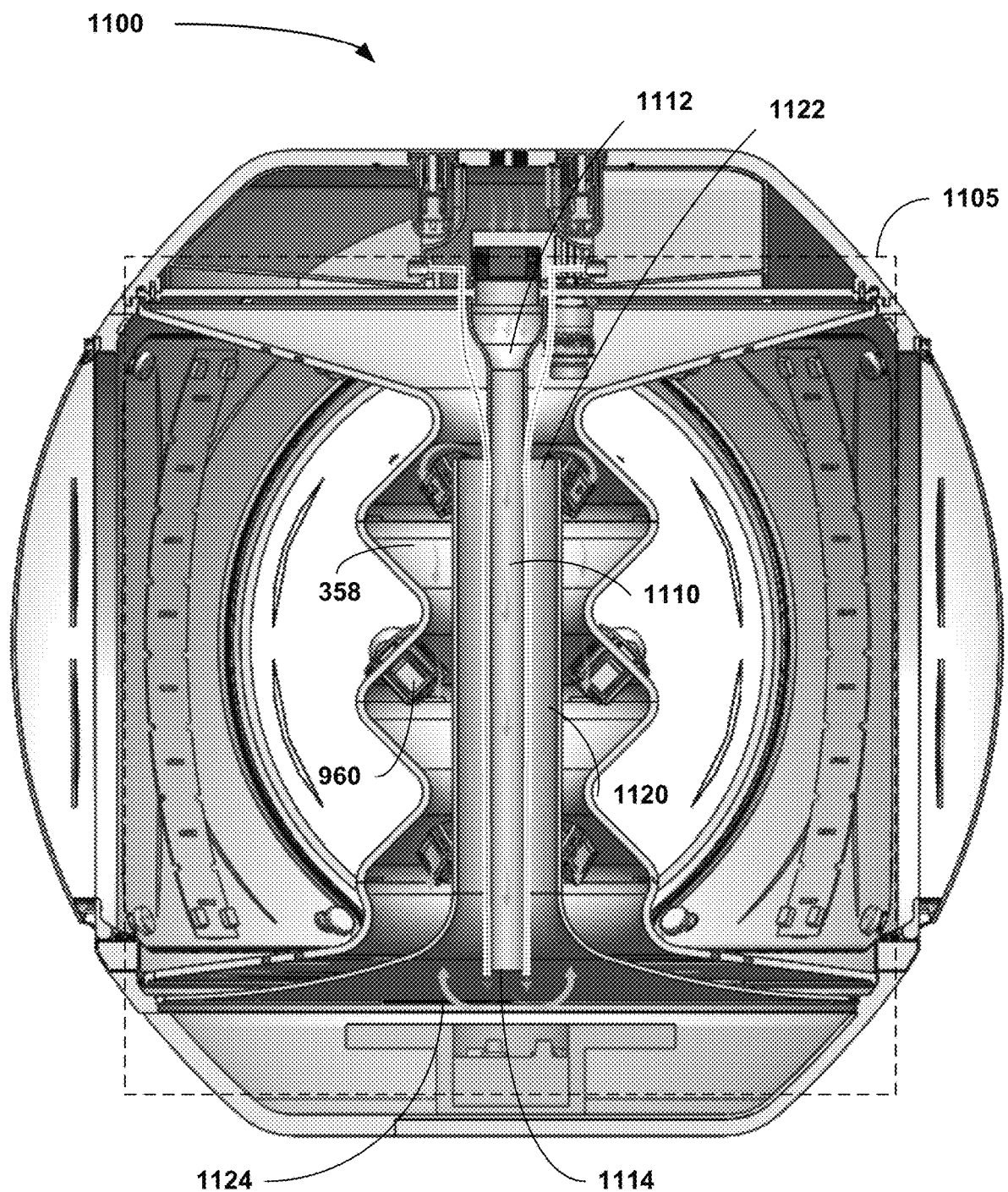
FIG. 11 illustrates another example of a fogponics apparatus, in accordance with some embodiments.

FIG. 11 illustrates another example of a fogponics apparatus 1100, in accordance with some embodiments. The fogponic system 1100 includes a fogging subsystem 1105 that comprising a fog channel 1110 and an air channel 1120. The fog channel 1110 has a first fog channel end 1112 that is open and a second fog channel end 1114 that is closed. The air channel 1120 is located within the fog channel 1110 and has a first air channel end 1122 extending past the first fog channel end 1112, and a second air channel end 1124 within the fog channel 1110. The second air channel end 1124 is distanced away from the closed second fog channel end 1114 such that when vaporized liquid is sent from the first air channel end 1122 to the second air channel end 1124, the vaporized liquid egresses the second air channel end 1124 and travels through the fog channel 1120 to the first fog channel end 1112.

In some embodiments, the fogging subsystem 1105 comprises a drawer reservoir 366 holding liquid. Liquid from the water reservoir and nutrient reservoir is pumped into the drawer reservoir. The drawer reservoir 366 is attached to the first air channel end 1122 and a fogger 370 that vaporizes the liquid. The fogger 370 in the drawer reservoir 366 vaporizes the water/nutrient solution.

In some embodiments, the fogging subsystem 1105 comprises at least one of a water reservoir 552 or a nutrient reservoir 554. Liquid in the at least one of the water reservoir 552 or the nutrient reservoir 554 may be pumped into the drawer reservoir 366.

In some embodiments, the fogging subsystem 1105 comprises a fan for blowing the vaporized liquid from the first air channel end 1122 to the second air channel end 1124. Air from the fan (e.g., DC fan) in the top is blown through the air channel and into the drawer reservoir 366 via the fog channel 1110. Fog is then pushed by the air, up through the fog channel 1110 and to the top. The fog may be pushed up by pressure of the fan blowing down the air channel 1120 which then rebounds off of the closed end 1124 of the fog channel 1120.

In some embodiments, the fogging subsystem 1105 is in a chamber of the fogponics apparatus 1100 such that when the vaporized liquid egresses the second fog channel end 1114, the vaporized liquid enters the chamber of the fogponics apparatus 1100.

In some embodiments, the chamber of the fogponics apparatus 1100 comprises a root chamber 358, and the vaporized liquid that egresses the first fog channel end 1112 enters the root chamber 358.

In some embodiments, gravity causes the vaporized liquid to fall within the root chamber 358. Once fog is pushed up to the top, gravity then pulls the fog back down and over the vegetation roots. Typically, the fog will dissipate relatively evenly after entering the root chamber 358. The spacing and approximately 45 degree angles of the pod assemblies 960 allows for fog droplets to contact each root in the pods 960 to have an equal share of fog moisture.

It should be noted that the air channel and fog channel combination prevents excess water from splashing on pods 960 on the bottom layer, and provides relatively even distribution of fog droplets in the root chamber 358. The fogger 370 may be actuated based on a timer. In some embodiments, fans may intermittently turn on and off to blow the water/nutrient vaporized liquid down the air channel. The intermittent on and off of the fan prevents constant pressure and allows for a more even distribution of fog in the root chamber 358. There also water efficiency gain due to lack of constant pressure of the fan. With constant fan pressure (i.e., not intermittent) some fog may escape from the root chamber 358. With intermittent fan pulsing, there is less pressure in the root chamber 358, and thus less fog escape. The fogger lifespan also increases.

Figure 12A:
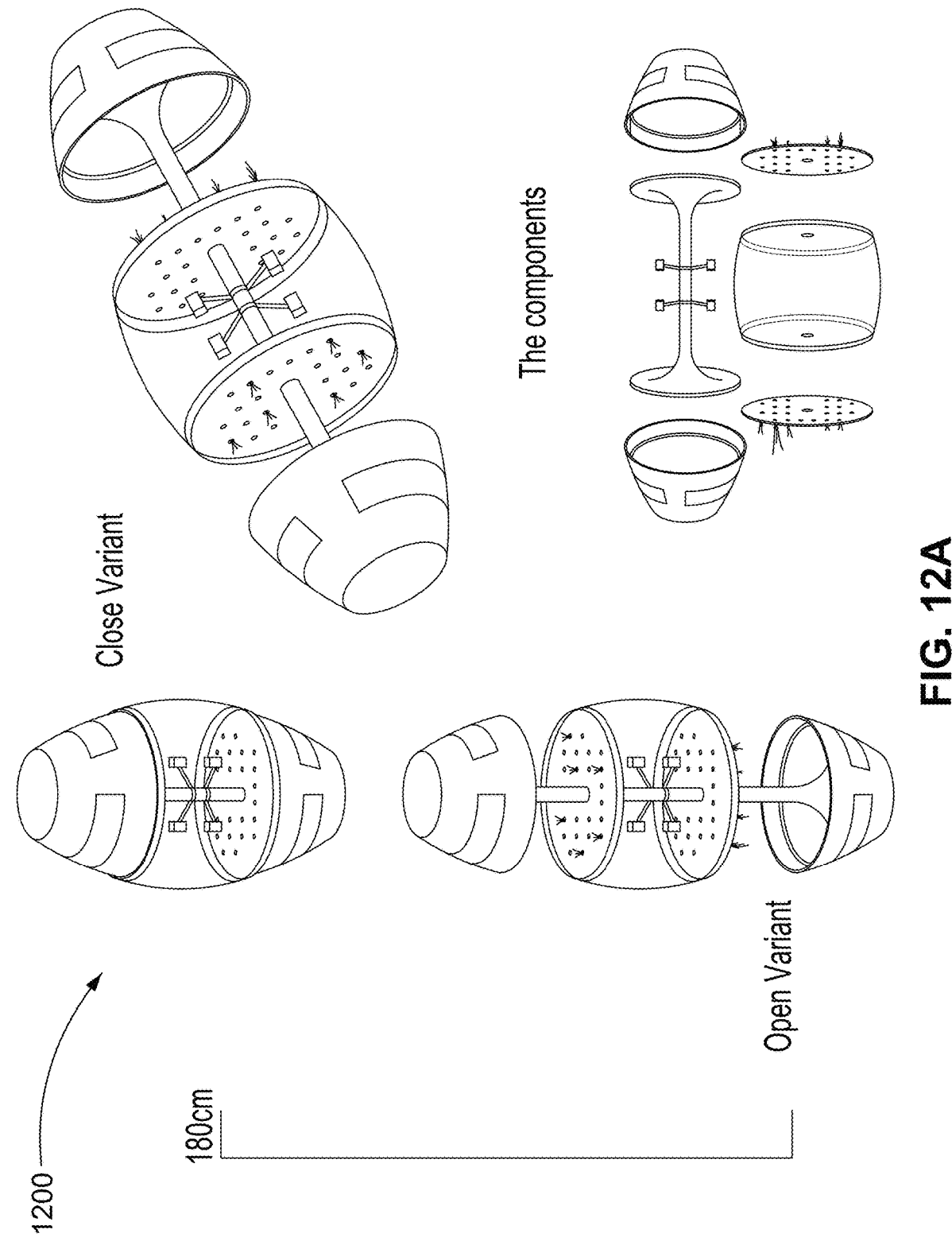
FIGS. 12A and 12B illustrate, in design drawings, another example of a fogponics assembly and its components, in accordance with some embodiments.
Figure 12B:
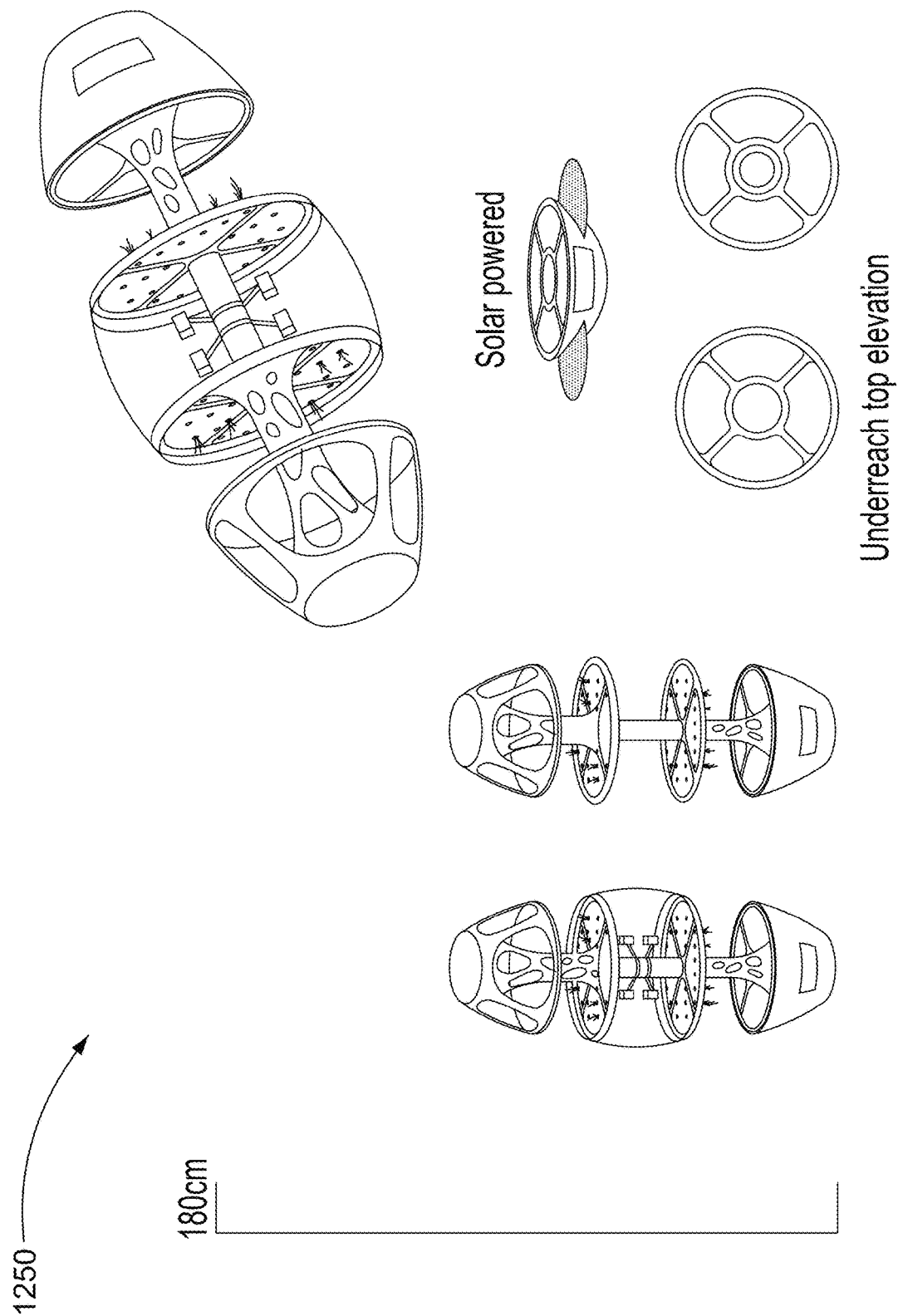

FIGS. 12A and 12B illustrate, in design drawings, another example of a fogponics assembly and its components 1200, 1250, in accordance with some embodiments.

Figure 13A:
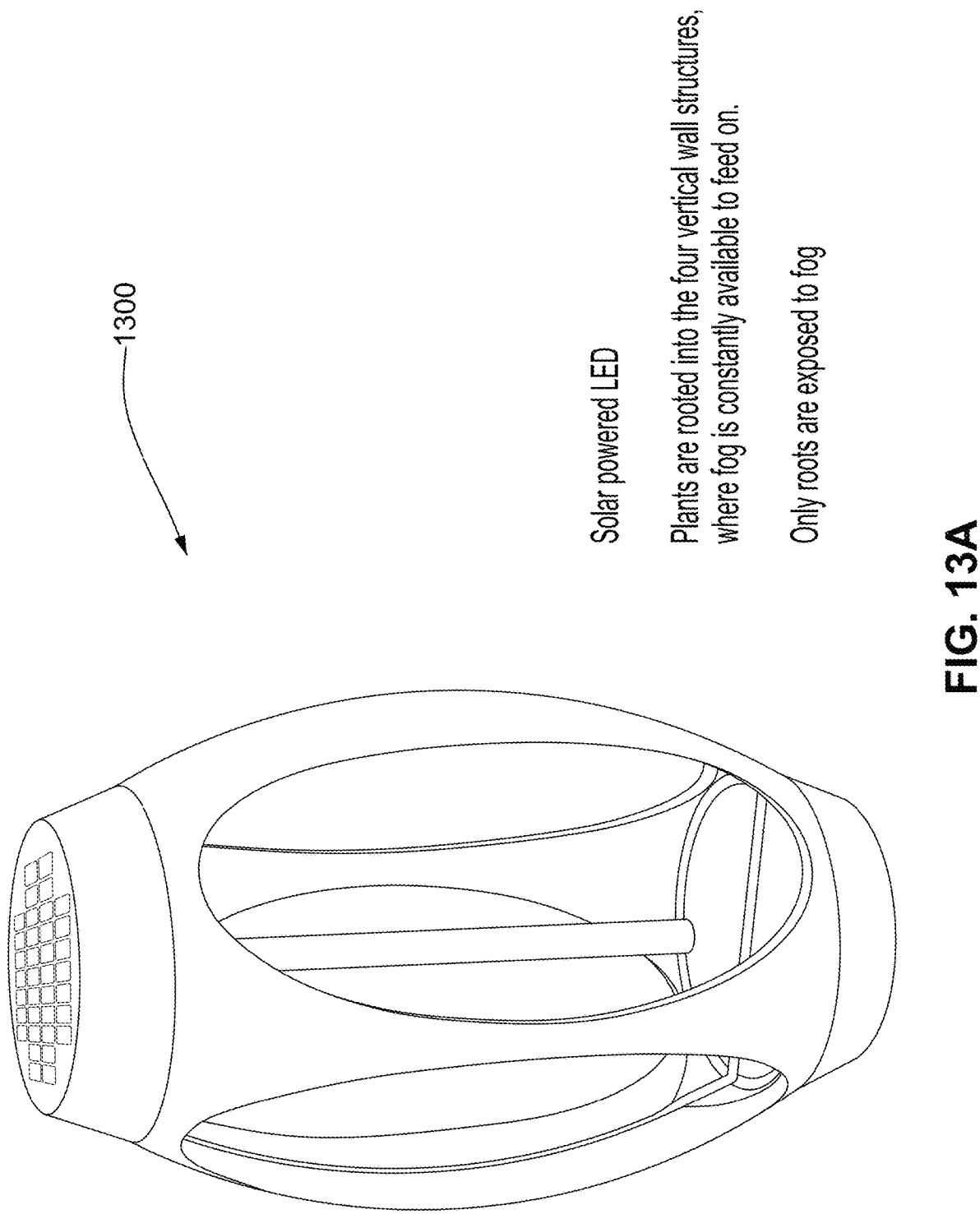
FIGS. 13A and 13B illustrate another example of a fogponics assembly, in accordance with some embodiments.
Figure 13B:
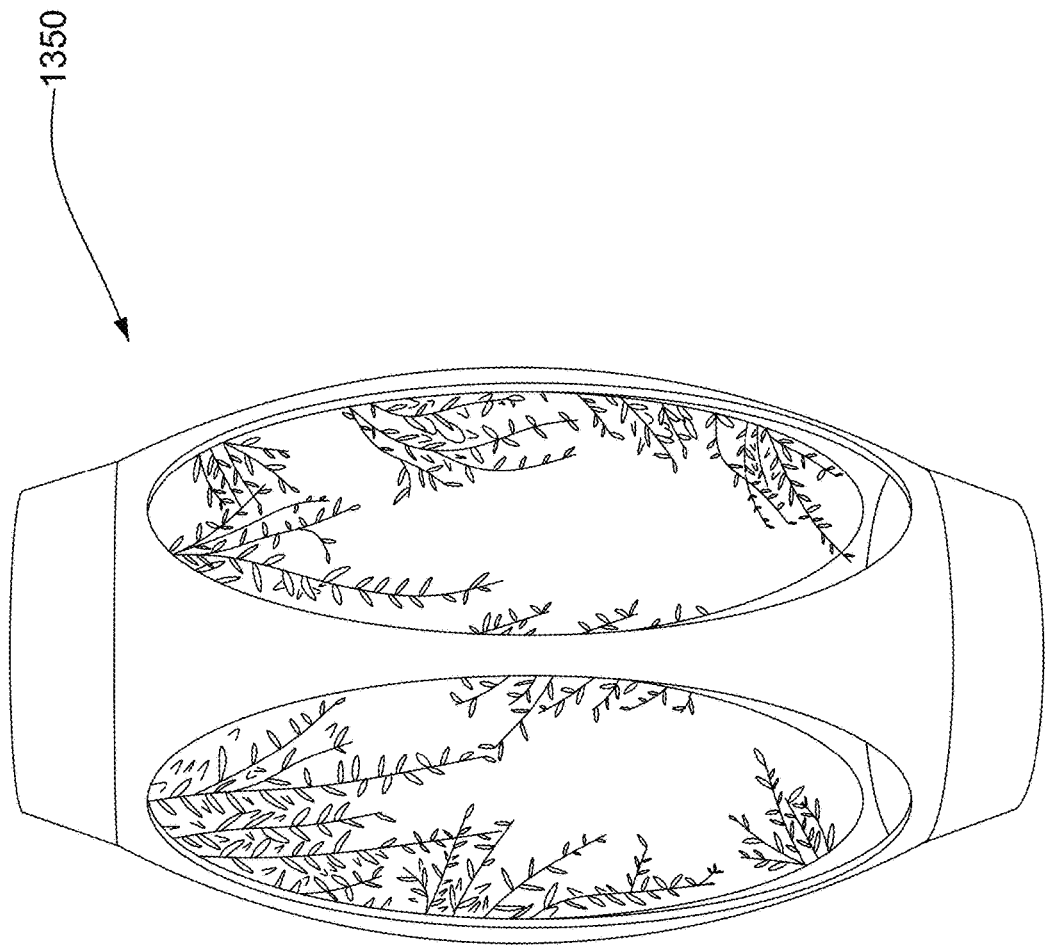
Figure 15A:
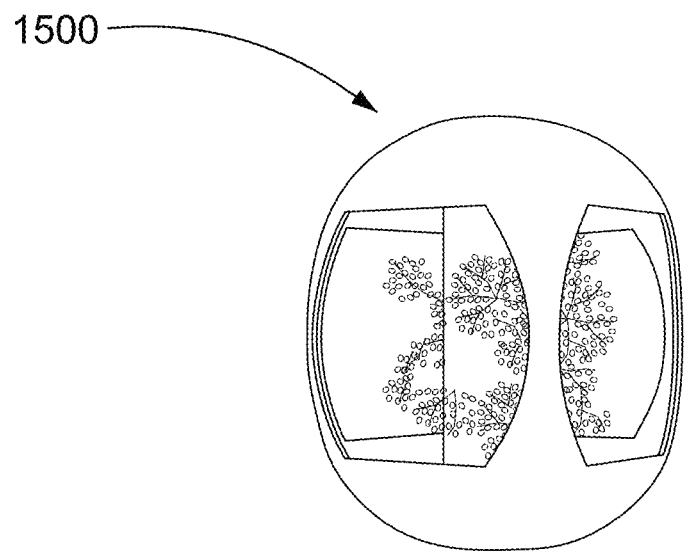
FIGS. 15A to 15D illustrate examples of fogponics assembly variation shells and lighting systems, in accordance with some embodiments.
Figure 15B:
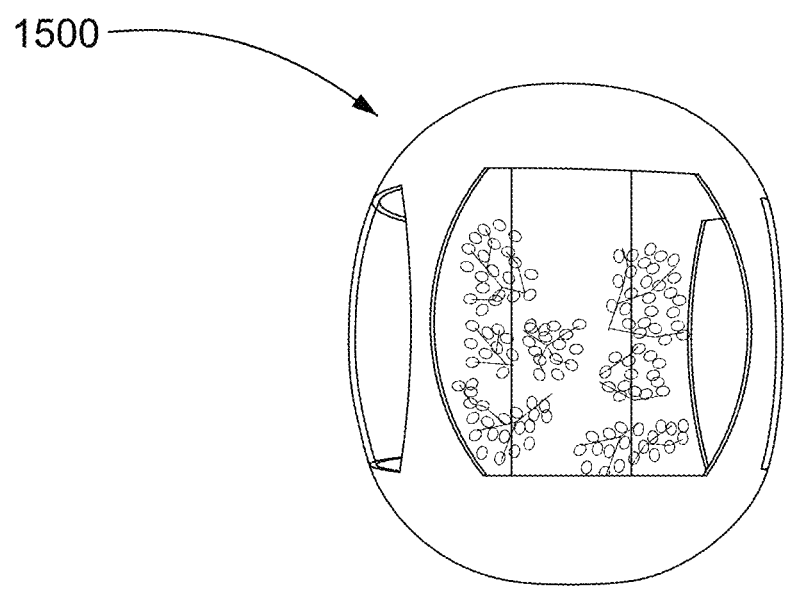
Figure 15C:
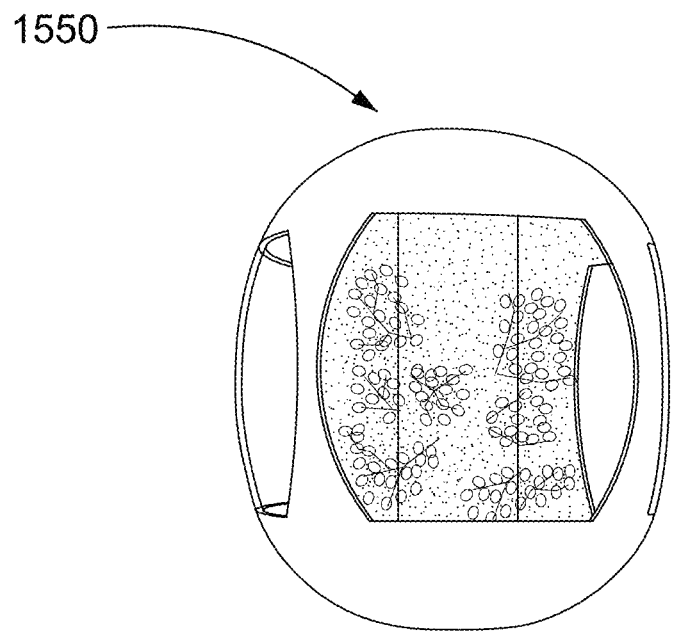
Figure 15D:
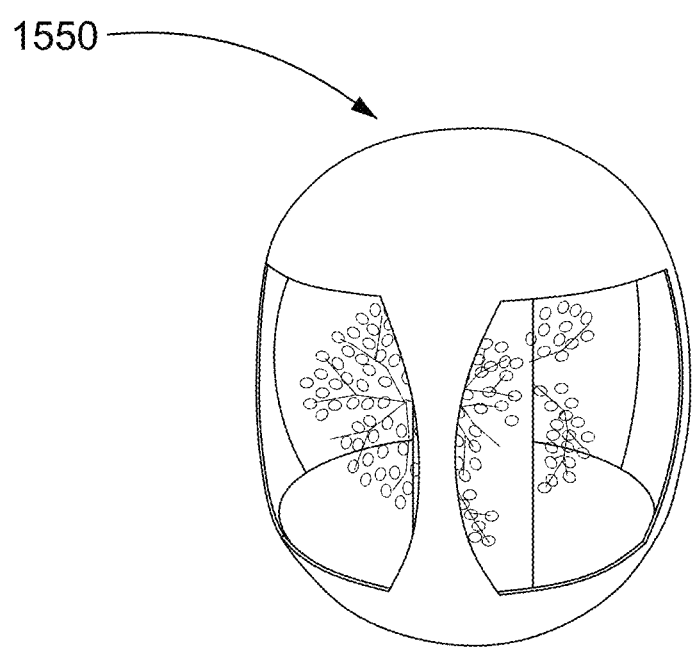

FIGS. 13A and 13B illustrate another example of a fogponics assembly 1300, 1350, in accordance with some embodiments.

FIG. 14 illustrates an example of a functionality of fogponics towers 1400, in accordance with some embodiments. In this example, a solar powered LED fits through the top of the assembly. With a transparent glass, the growth of the plant may be observed. Plants may be placed into the four sides, all facing towards the LED light. The two parts may be snap fitted together. Water may be placed in the bottom of the assembly. The water is converted to fog through the bottom sonic fogger and may spread through all the plant roots (which are hanging into the four vertical sides). Once water is out of running low, the water reservoir may be removed and refilled.

In some embodiments, a root chamber is created that is sealed off within the middle and then roots are exposed to it. This design can potentially be solar powered to increase sustainability. In some embodiments, the fogponics assembly may incorporate:

The use of recycled/biodegradable/sustainable plastic.
Battery system or solar system to power the device.
Glass doors can open automatically with the support of an upgraded hinge mechanism.
Changes in the parametric patterns
Rotational middle root chamber, so all plants obtain equal amount of light.

FIGS. 15A to 15D illustrate examples of fogponics assembly variation shells and lighting systems 1500, 1550, in accordance with some embodiments.

Figure 16A:
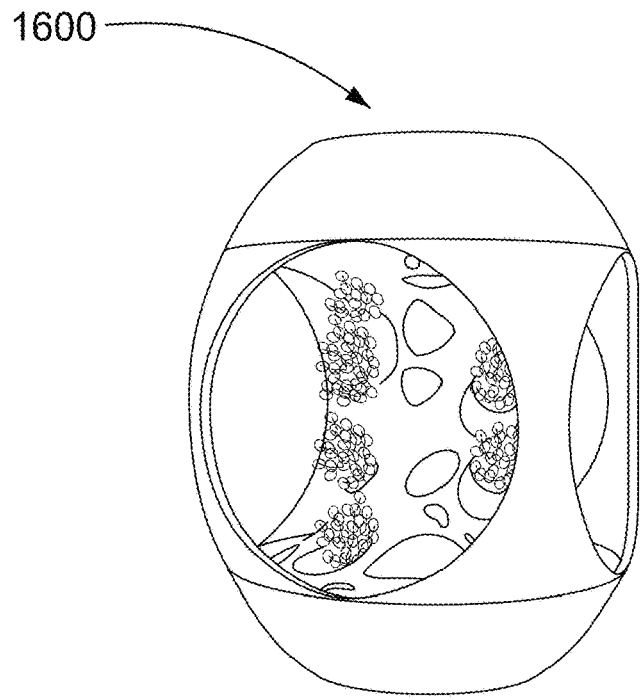
FIGS. 16A and 16B illustrate another example of a fogponics assembly, in accordance with some embodiments.
Figure 16B:
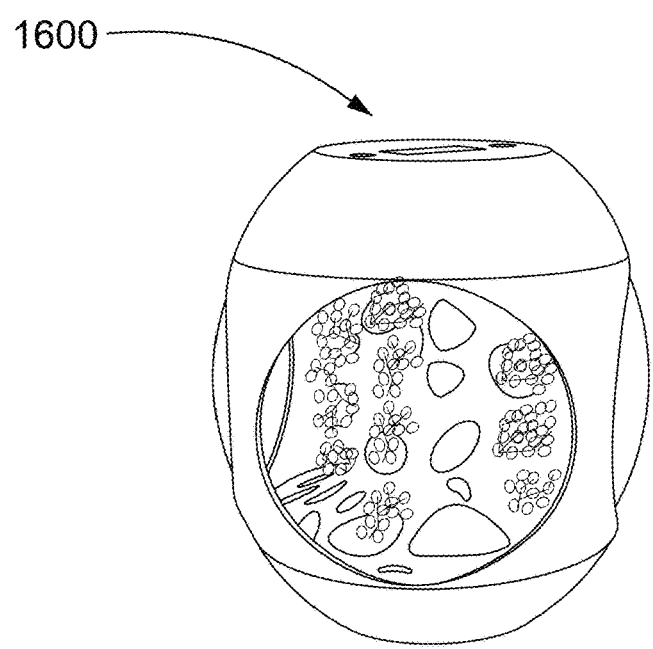

FIGS. 16A and 16B illustrate another example of a fogponics assembly 1600, in accordance with some embodiments. In some embodiments, the lights will be on the sides and the plants will grow from the middle at 45-degree angle. Components to be made from injection moulded polypropylene/polyethylene. Glass windows to seal off the plants and to keep the environment controlled (CEA—Controlled Environmental Agriculture), keeping the fog inside and maximizing yield. Three main bodies may be provided to reduce assembly/manufacturing cost. Electrical components may go on the top of the product. The water and the nutriment will have a small reservoir on the top, and the larger ones to go on the bottom.

Figure 17:
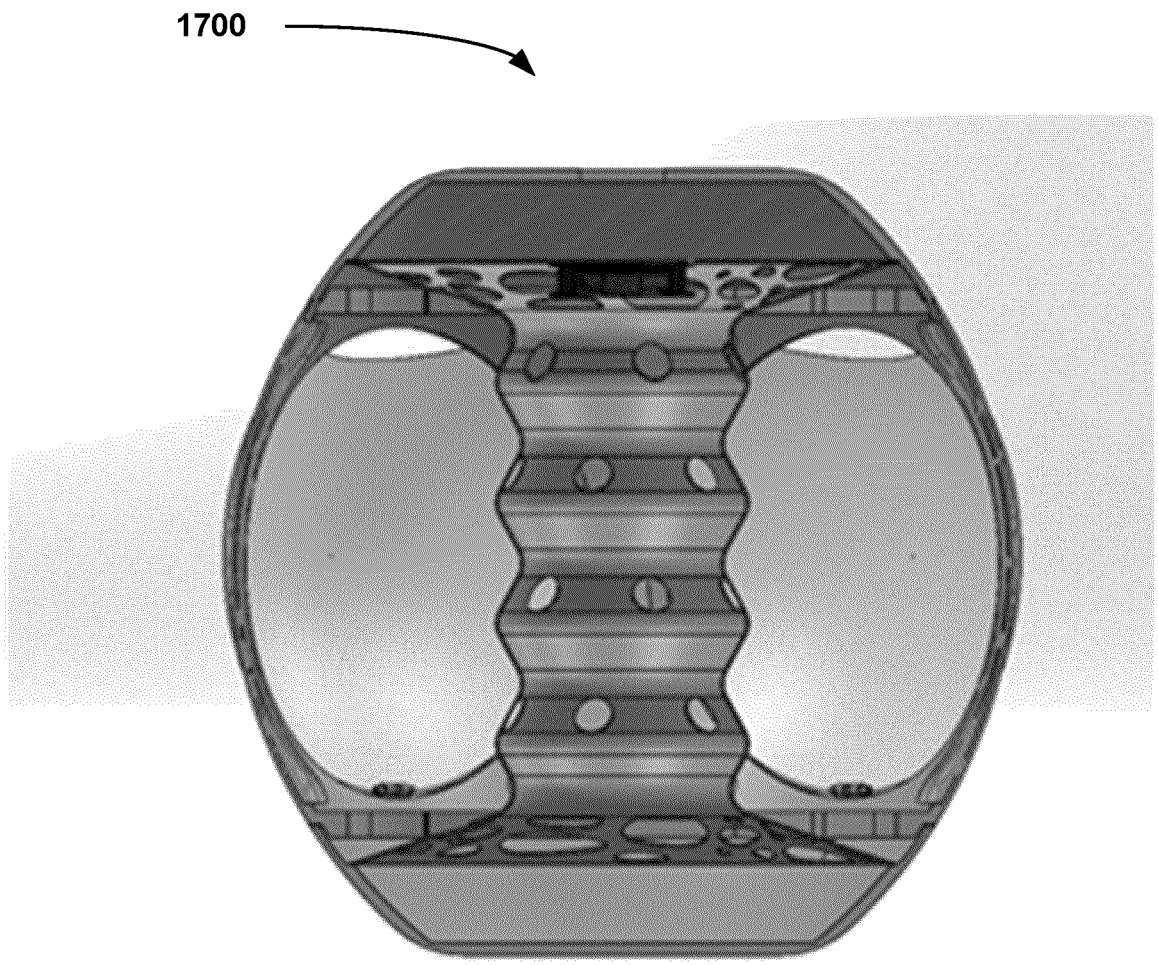
FIG. 17 illustrates, in a sectional view, another example of a fogponics assembly, in accordance with some embodiments.

FIG. 17 illustrates, in a sectional view, another example of a fogponics assembly 1700, in accordance with some embodiments. In some embodiments, feature ribbing within the middle chamber to hold the seed cups. This will allow plants to grow upwards while minimizing root conflict and maximizing growth space for maximum yield. This also allows the cups to be inserted straight into the middle chamber without another design component or subcomponent. A hinge mechanism allows for the windows to open and close. This is to allow the user to reach in and harvest their crops or open the product for additional oxygen. A fan on the top to pull in air from the exterior and direct the air down through a tube inside the root chamber close to the piezoelectric transducers. In some embodiments, the tube may be within approximately two to four inches away from the water surface to push air down, allowing fog to travel up the root chamber to reach all cups and feed all roots.

Figure 18A:
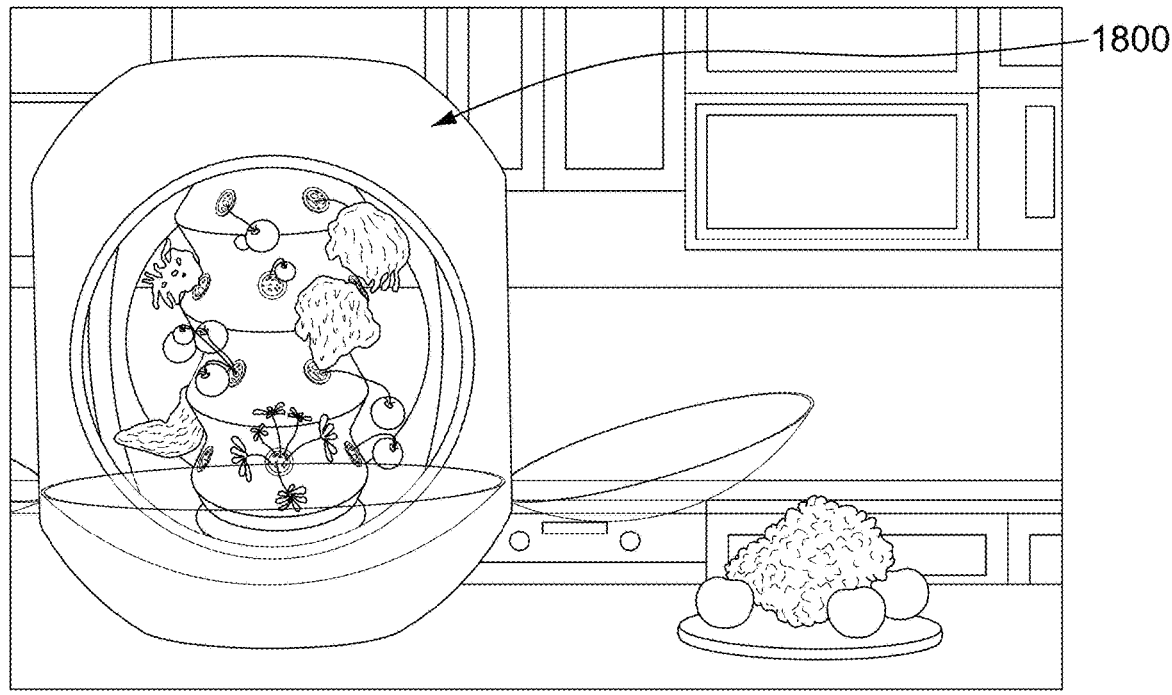
FIGS. 18A and 18B illustrate another example of a fogponics assembly in an environment, in accordance with some embodiments.
Figure 18B:
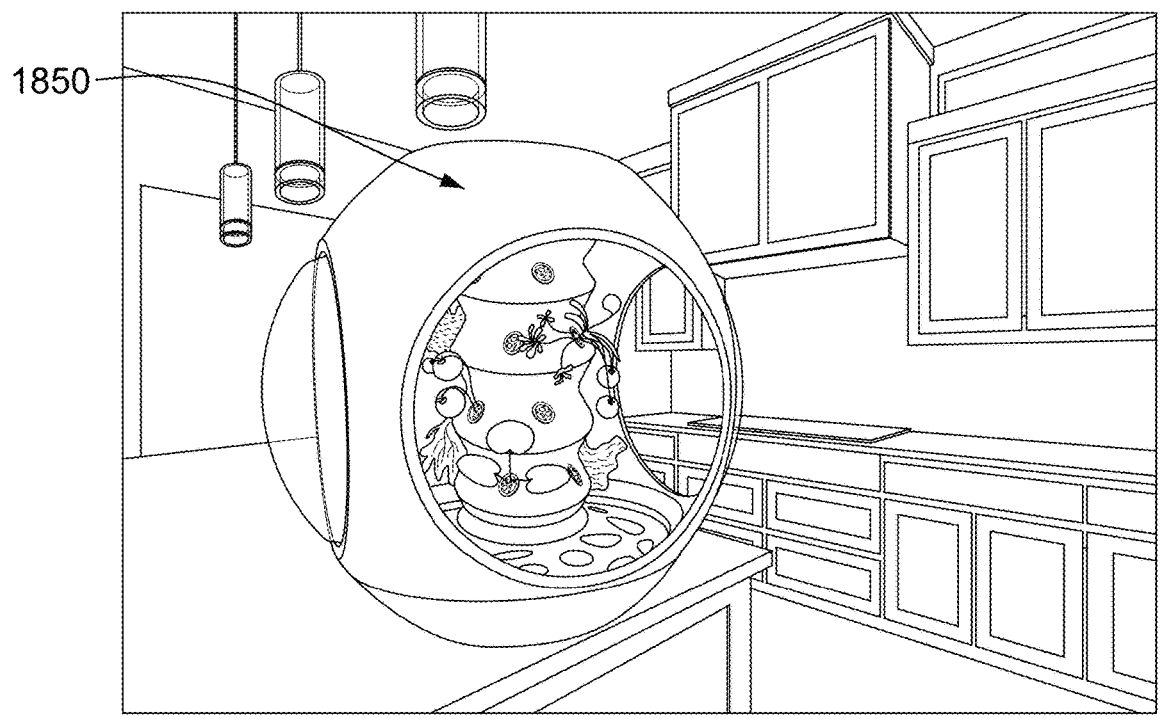
Figure 19:
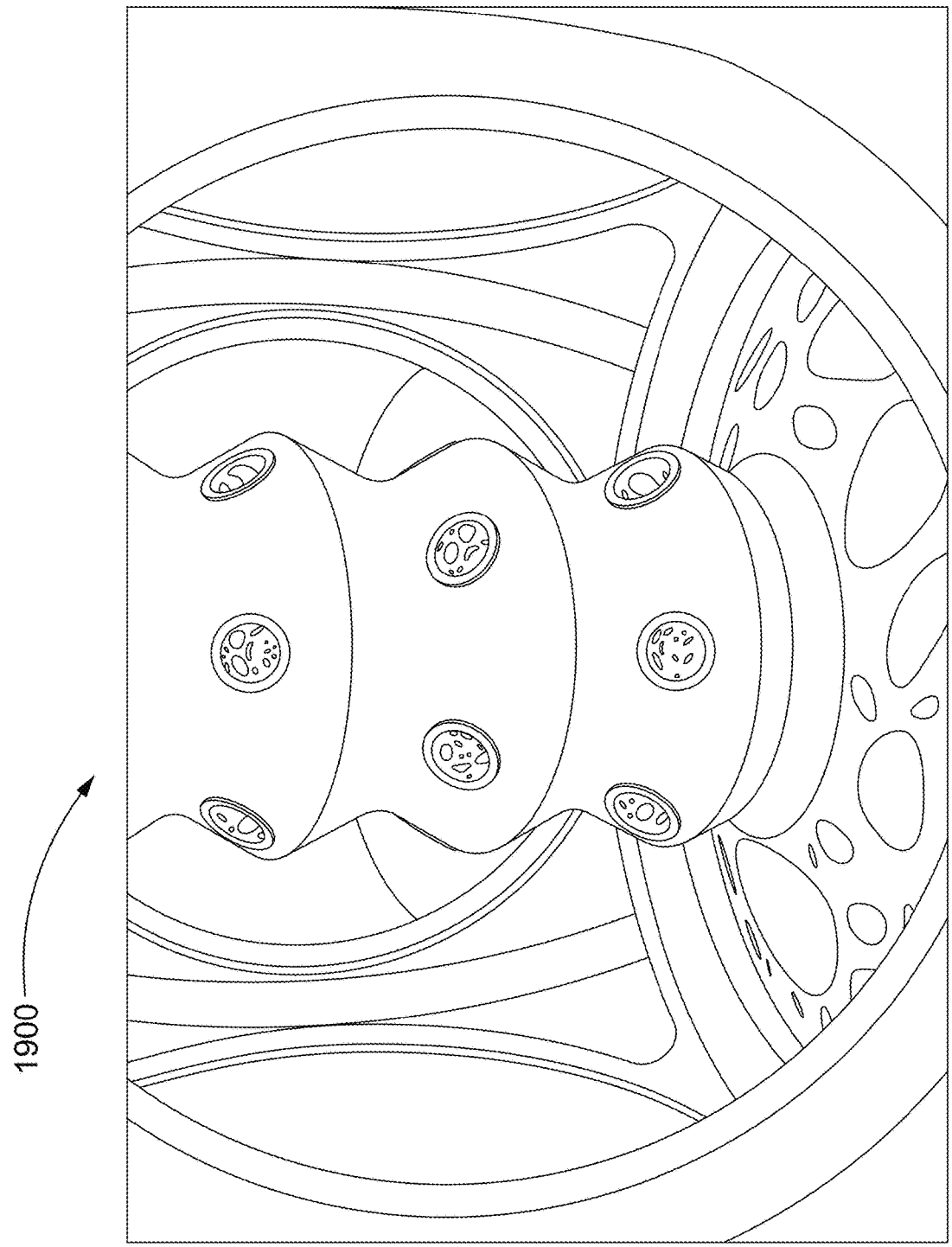
FIG. 19 illustrates an example of an inner shaft of the fogponics assembly, in accordance with some embodiments.

FIGS. 18A and 18B illustrate another example of a fogponics assembly in an environment 1800, 1850, in accordance with some embodiments. FIG. 19 illustrates an example of an inner shaft of the fogponics assembly 1900, in accordance with some embodiments. In some embodiments, the LED will be protected by a piece made out of acrylic (or a potentially more efficient material) to prevent water vapor damage. A modular LED system will change the colour/light spectra in white and pink, depending on the plants' need for photosynthesis (specifications vary by plant type). An LCD screen position potentially on top or side, or offsetting from device. Cups are the same concept as the middle chamber.

Figure 20A:
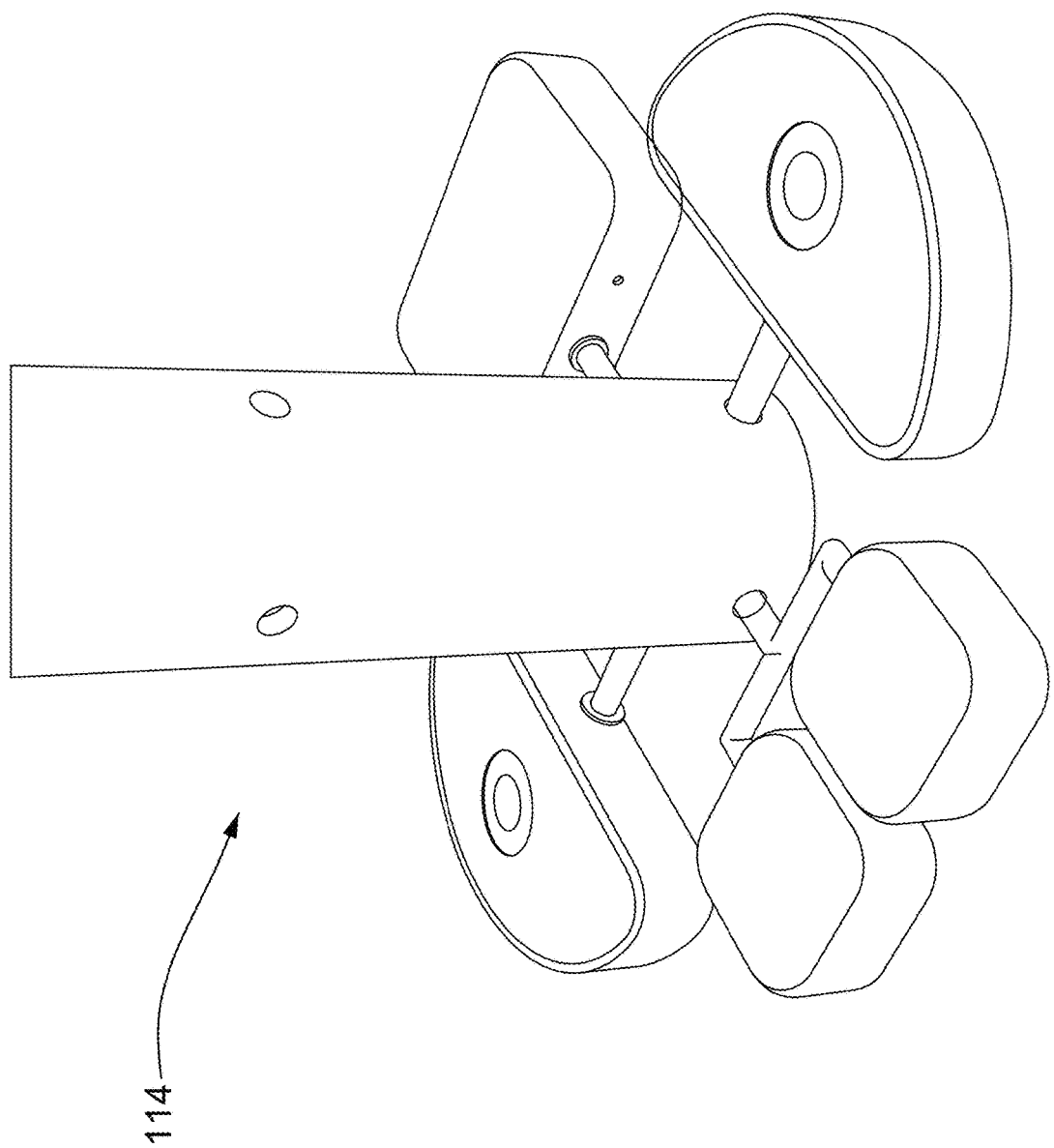
FIGS. 20A and 20B illustrate, in a component drawings, the fog functionality, in accordance with some embodiments.
Figure 20B:
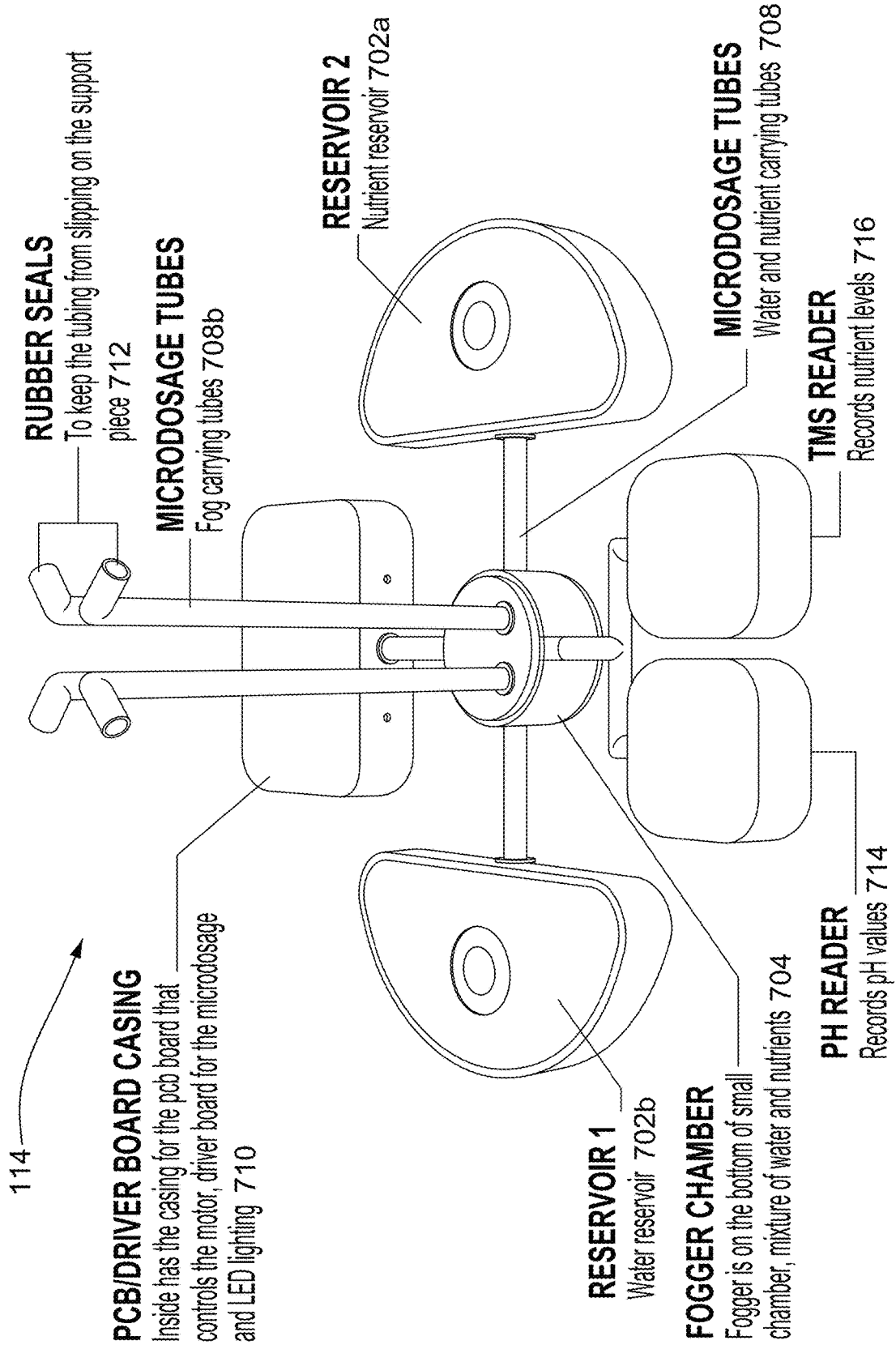

FIGS. 20A and 20B illustrate, in a component drawings, an example of the fog functionality 114, in accordance with some embodiments. The fog functionality 114 subsystem comprises nutrient and water reservoirs 702, a fogger chamber in the middle 704, microdosing pumps, and is coded to correspond simultaneously with a motor. In some embodiments, there are two reservoir basins, one for nutrients 702*a* and the other for water 702*b*. The basis 702 will connect into the middle chamber 704 (small reservoir that has the ultrasonic fogger in it) through microdosage tubing 708 to pump measured and/or predetermined amount of nutrients and water, making an enriched nutrient solution that serves as plant food. This then travels up the tubes 708*b* into a middle compartment. It may be coded to correspond simultaneously with the motor. As each week requires x amount of extra dosage each week for the growing plants, the motor will know the plants are growing and turn slightly clockwise.

The fog functionality 114 may also comprise a PCB/driver board casing 710 that includes a casing for the PCB board that controls the motor, driver board for the microdosage and LED lighting. Rubber seals 712 may keep the tubing 708*b* from slipping off of the support piece. A PH reader 714 may record pH values and a TMS reader 716 may record nutrient levels.

Fogponics Assembly Functionality

Is some embodiments, the fan is located in the top of the device, with the purpose of pulling air from the exterior, and pushing it down through a tube, where the end is located a few inches away from the fogger system. The reason the fan is located in the top is to prevent any moisture or humidity from entering the fan electrical components, thereby increasing the lifespan of the fan itself. In this air flow tube, there will be nutrients that will go down as well, due to a dosing pump. These nutrients will travel down the tube, into the bottom water reservoir, where both solutions will be mixed. The bottom base will act as a general water reservoir, where the fogger system will be located in the middle. Water that condensation in the device will be found on the sides (columns and windows), and due to gravity will drop down. The "egg-shape" design allows the water to drip down the walls to the bottom base reservoir, allowing the water cycle from liquid state, to fog, back to liquid, to be reused. The purpose of this is to decrease any waster of water/nutrients within the process, and prolong the water refill time.

The light strips run around a curve that allows an even distribution of light. Because the middle root chamber still takes up a cylindrical-like space, the plants are still growing at a 45 degree angle to maximize the yield of growth. The top part of the fogponics assembly curves back inside so the top lighting can provide the right amount of light to the plants. If the lights were further way (e.g., if the assembly body was shaped resemble an inverse cone), more power would be required for the wavelengths to reach the leaves. To reduce the amount of power needed, the top portion of the assembly body is curved back inwards; the same way the bottom curves inwards.

Windows are optional to allow for internal visibility. If the windows are one way mirrors, they would reflect 50% of the light back to the plants. While the curvature of the windows provide design aesthetics, the curvature does allow some of the distribution of the light reflected to be more dispersed (versus a flat mirror that reflects light straight).

Due to gravity, and liquid that condensates on the internal side walls of the assembly body will go straight down. The curvature of the assembly body allows the water to drip towards the centre at the bottom. This promotes condensation liquid to go into the fogger chamber where it can be turned to fog, and prevents water build-up that would occur at the corners if there was a 90 degree angle at the bottom reservoir (instead of the egg-shape curvature). Therefore, the egg-shape promotes the saving of water.

In some embodiments, a predetermined method, executed by the processors in the device, maintain the desired environmental conditions in the device. Th desired environmental conditions may be initially selected by a user through the user interface. These conditions and methods may be determined based on the plant cultivar(s) that is/(are) selected by the user. The lighting timing, intensity and spectrum proportions may be determined for the specific plant cultivars based on experimental information collected prior to the implementation of the method.

Methods may also control the release of water and nutrient solutions into the fogger chamber of the device. The amounts administered may be programmed based on the experimental results of prior experiments conducted where those plant cultivars have been grown in that device. The fogger timing, fan timing, and fan speed intensity may also be predetermined based on experimental data collected as previously mentioned.

Conditions for a specific cultivar or set of cultivars may be determined experimentally, and implemented into the methods executed by the device, based on the cultivar(s) selected by the user through the user interface. These algorithmically programmed methods may also be updated or added for each specific cultivar or set of cultivars as the ongoing experimental evidence allows for the optimization of these conditions to be discovered.

Alternatively, the nutrient concentration may be controlled based on an electroconductivity (EC) sensor in the fogger chamber, that monitors the nutrient concentration, compares the concentration to the desired concentration, and administers more nutrient solution or more water into the fogger chamber in order to raise or lower the concentration to the desired value as determined based on experimental data collected on growing those plant cultivars in the device.

It should be noted that while the fogponics assembly has been shown in an "egg-shape" body, other shapes are possible. For example, if only the lighting elements are desired, a conical shape may mimic the upper portion of the egg-shape body described above.

Alternatively, if only the fogging functionality and water condensation efficiency is desired, an upside-down conical shape may mimic the lower body portion of the egg-shape body described above.

Experimentation

The general concept of the experimentation process follows a similar process. Plant cultivars are selected to be grown together in the device, based on similar preferences of the cultivars to environmental conditions that include, similar photoperiods, daily light integrals (DLIs), nutrient concentrations, nutrient compositions, time to reach harvest, and root moisture preferences. These similar cultivars are then tested in devices with varying environmental conditions, and it is determined which cultivars are compatible to grow with each other in the device, as well as what the optimal conditions are for a given group of cultivars. This information of each of these environmental conditions are then coded into to the electronic control unit of the device, so that the device itself can create the conditions using the processes described in the paragraphs above to grow these groups of cultivars together. Through this method of experimentation, several plant cultivars can be grown well in the device, excluding plant cultivars that are limited by temperature or shoot-system space.

Figure 21:
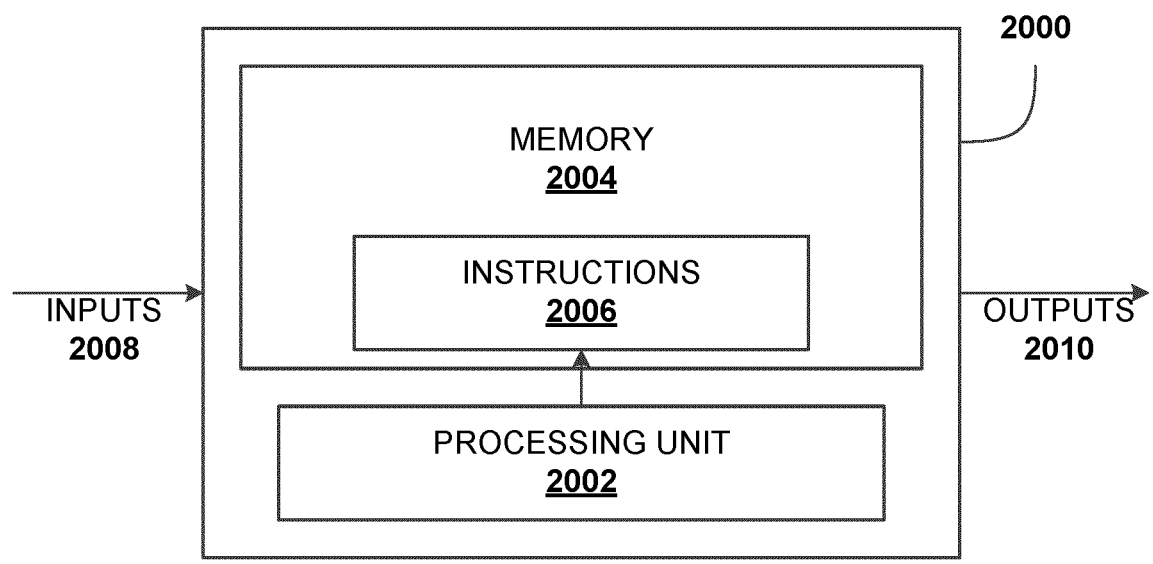
FIG. 21 is a schematic diagram of a computing functionality that can be run on a chip to run the motor.

FIG. 21 is a schematic diagram of a system chip 2000, as a combination of software and hardware components in a computing device 2000. The computing device 2000 may comprise one or more processing units 2002 and one or more computer-readable memories 2004 storing machine-readable instructions 2006 executable by the processing unit 2002 and configured to cause the processing unit 2002 to generate one or more outputs 2010 based on one or more inputs 2008. The inputs 2008 may comprise one or more signals representative of time since last expansion, pH level, nutrient level, etc. In some embodiments, the outputs 2010 may comprise one or more signals representative of the adding of water and/or nutrients, actuation of fans and pumps, and/or the actuation of the motor to expand the device 100, 200 using a rack and pinion hybrid.

Processing unit 2002 may comprise any suitable devices configured to cause a series of steps to be performed by computing device 2000 so as to implement a computer-implemented process such that instructions 2006, when executed by computing device 2000 or other programmable apparatus, may cause the functions/acts specified herein to be executed. Processing unit 2002 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 2004 may comprise any suitable known or other machine-readable storage medium. Memory 2004 may comprise non-transitory computer readable storage medium such as, for example, but not limited to, an electronic, magnetic, optical, electromagnetic, infrared, or semiconductor system, apparatus, or device, or any suitable combination of the foregoing. Memory 2004 may include a suitable combination of any type of computer memory that is located either internally or externally to computing device 2000 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 2004 may comprise any storage means (e.g. devices) suitable for retrievably storing machine-readable instructions 2006 executable by processing unit 2002.

Memory 2004 may also include information regarding when the device 100, 200 should expand given the vegetation that is growing. I.e., memory may store tables for different types of vegetation that tell the processor 2002 when to actuate the motor and/or when to dispense water and/or nutrients. Memory 2004 may also include information regarding when device 350 should add water or nutrients, or actuate pumps or fans.

Alternatively, the PCB board 712 may comprise communication means to communicate with a computing device to receive operating instructions and/or data pertaining to the vegetation growing.

Figure 22:
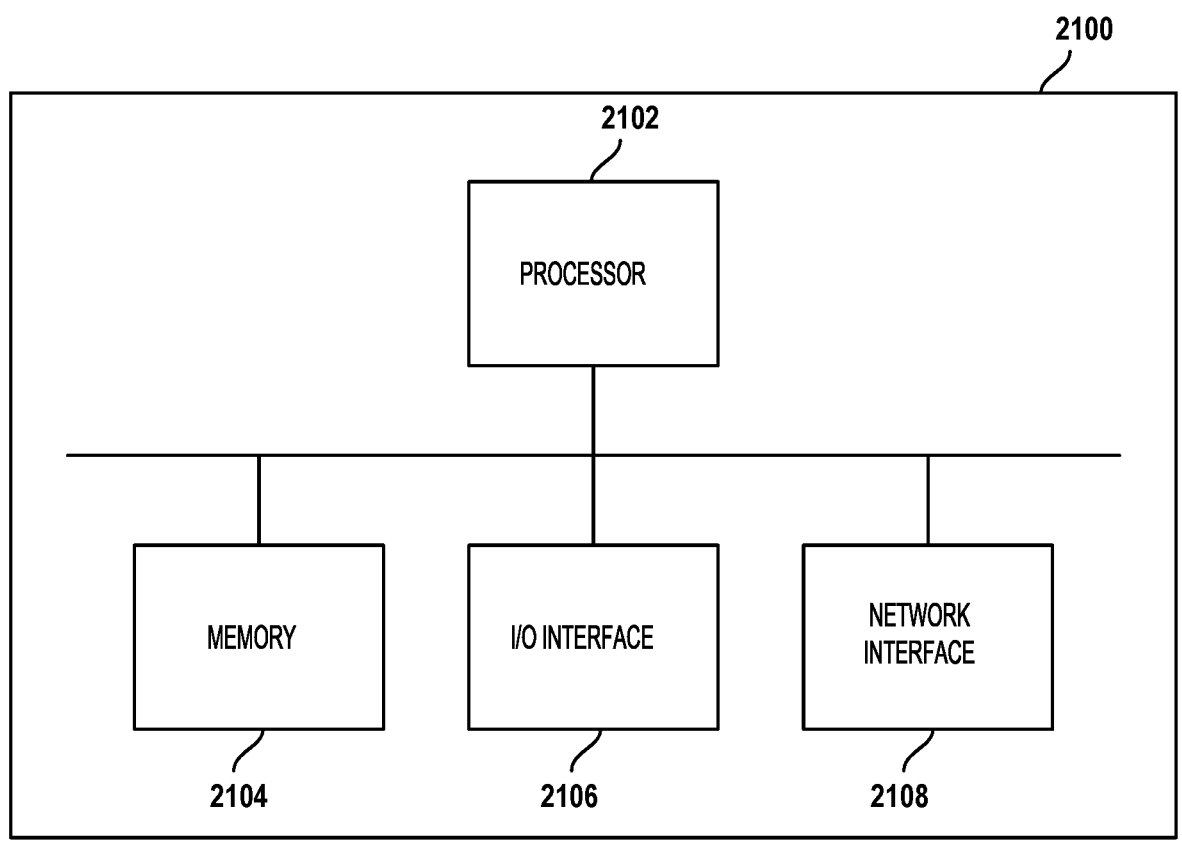
FIG. 22 is a schematic diagram of a computing device such as a server.

FIG. 22 is a schematic diagram of a computing device 2100 such as a server. As depicted, the computing device 2100 includes at least one processor 2102, memory 2104, at least one I/O interface 2106, and at least one network interface 2108.

Processor 2102 may be an Intel or AMD x86 or x64, PowerPC, ARM processor, or the like. Memory 2104 may include a suitable combination of computer memory that is located either internally or externally such as, for example, random-access memory (RAM), read-only memory (ROM), compact disc read-only memory (CDROM).

Each I/O interface 2106 enables computing device 2100 to interconnect with one or more input devices, such as a keyboard, mouse, camera, touch screen and a microphone, or with one or more output devices such as a display screen and a speaker.

Each network interface 2108 enables computing device 2100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:
1. A fogging system comprising:
a fog channel having:
  a first fog channel end that is open; and
  a second fog channel end that is closed;
an air channel within the fog channel, the air channel having:
  a first air channel end extending past the first fog channel end; and
  a second air channel end within the fog channel;
wherein the second air channel end is distanced away from the closed second fog channel end such that when vaporized liquid is sent from the first air channel end to the second air channel end, the vaporized liquid egresses the second air channel end and travels through the fog channel to the first fog channel end,
wherein the fogging system is in a chamber of a fogponics apparatus such that when the vaporized liquid egresses the second fog channel end, the vaporized liquid enters the chamber of the fogponics apparatus; and wherein the chamber of the fogponics apparatus comprises a root chamber; and the vaporized liquid that egresses the first fog channel end enters the root chamber.

2. The fogging system as claimed in claim 1, comprising:
a drawer reservoir holding liquid, the drawer reservoir attached to the first air channel end; and
a fogger that vaporizes the liquid.

3. The fogging system as claimed in claim 2, comprising at least one of a water reservoir or a nutrient reservoir, wherein liquid in the at least one of the water reservoir or the nutrient reservoir is pumped into the drawer reservoir.

4. The fogging system as claimed in claim 1, comprising a fan for blowing the vaporized liquid from the first air channel end to the second air channel end.

5. The fogging system as claimed in claim 1, wherein gravity causes the vaporized liquid to fall within the root chamber.

6. A fogging method comprising:
sending vaporized liquid from a first end of an air channel to a second end of the air channel, wherein:
the air channel is within a fog channel having:
a first fog channel end that is open; and
a second fog channel end that is closed;
the first air channel end extends past the first fog channel end;
the second air channel end is within the fog channel; and
the second air channel end is distanced away from the closed second fog channel end such when the vaporized liquid egresses from the second air channel end, the vaporized liquid travels through the fog channel to the first fog channel end,
wherein the fogging system is in a chamber of a fogponics apparatus such that when the vaporized liquid egresses the second fog channel end, the vaporized liquid enters the chamber of the fogponics apparatus; and
wherein the chamber of the fogponics apparatus comprises a root chamber; and the vaporized liquid that egresses the first fog channel end enters the root chamber.

7. The method as claimed in claim 6, comprising:
holding liquid in a drawer reservoir, the drawer reservoir attached to the first air channel end; and
vaporizing the liquid using a fogger.

8. The method system as claimed in claim 7, comprising at least one of a water reservoir or a nutrient reservoir, wherein liquid in the at least one of the water reservoir or the nutrient reservoir is pumped into the drawer reservoir.

9. The method as claimed in claim 6, comprising blowing the vaporized liquid from the first air channel end to the second air channel end using a fan.

10. The method as claimed in claim 6, wherein gravity causes the vaporized liquid to fall within the root chamber.

11. A fogponics apparatus comprising:
a fog functionality subsystem for actuating expansion and contraction of the apparatus; and
a lighting system for providing LED light to a plant growing area of the apparatus, wherein:
the fog functionality subsystem comprises:
a fog channel having:
a first fog channel end that is open; and
a second fog channel end that is closed;
an air channel within the fog channel, the air channel having:
a first air channel end extending past the first fog channel end; and
a second air channel end within the fog channel; and
wherein the second air channel end is distanced away from the closed second fog channel end such that when vaporized liquid is sent from the first air channel end to the second air channel end, the vaporized liquid egresses the second air channel end and travels through the fog channel to the first fog channel end.

12. The fogponics apparatus as claimed in claim 11, comprising:
a drawer reservoir holding liquid, the drawer reservoir attached to the first air channel end; and
a fogger that vaporizes the liquid.

13. The fogponics system as claimed in claim 12, comprising at least one of a water reservoir or a nutrient reservoir, wherein liquid in the at least one of the water reservoir or the nutrient reservoir is pumped into the drawer reservoir.

14. The fogponics system as claimed in claim 11, comprising a fan for blowing the vaporized liquid from the first air channel end to the second air channel end.

15. The fogponics system as claimed in claim 11, comprising a chamber, wherein when the vaporized liquid egresses the second fog channel, the vaporized liquid enters the chamber.

16. The fogponics system as claimed in claim 15, wherein:
the chamber of the fogponics apparatus comprises a root chamber; and
the vaporized liquid that egresses the first fog channel end enters the root chamber.

17. The fogponics system as claimed in claim 16, wherein gravity causes the vaporized liquid to fall within the root chamber.

18. The apparatus as claimed in claim 11, further comprising:
top and bottom light housing units for housing LEDs of the lighting system;
a base for supporting the apparatus components;
a base platform;
a middle glass chamber;
cups for holding growing plants in the apparatus;
middle, top and bottom support pieces; and
at least one growing platform for holding the cups.

19. The apparatus as claimed in claim 18, wherein the fog functionality subsystem comprises:
at least one processor; and
a memory storing instructions that when executed by the at least one processor, configure the processor to:
store historical crop growth data in a memory, the historical crop growth data comprising average size for a crop based on time since planted;
store current crop data, the current crop data comprising timing information regarding when the crop was planted; and
actuate a motor to expand a growing area of the apparatus based on the current crop timing information and the historical crop growth data.

20. The apparatus as claimed in claim 19, wherein the at least one processor is configured to actuate water to be added to a fogger unit.

21. The apparatus as claimed in claim 19, wherein the at least one processor is configured to actuate nutrients to be added to a fogger unit.

22. The apparatus as claimed in claim 19, comprising two opposing growth platforms, each opposing growth platform having LED lighting.

23. The apparatus as claimed in claim 11, further comprising:
- a rack and pinion hybrid subsystem for expanding and contracting the apparatus.

24. The apparatus as claimed in claim 22, further comprising:
- a gear coupled to the motor;
- opposing rods connected to the gear; and
- racks, each rack being attached to one of the opposing rods;
- wherein the at least one processor is configured to actuate the motor coupled to the gear that rotates to move the racks attached to the opposing rods, the gear is located near the centre of the apparatus between the two opposite growth platforms, and wherein the rods are each coupled to one of the light housing units such that movement of the rods causes the distance between the light housing units and the growth platforms to increase.

* * * * *